US008658016B2

(12) United States Patent
Lakkaraju et al.

(10) Patent No.: US 8,658,016 B2
(45) Date of Patent: Feb. 25, 2014

(54) CARBON DIOXIDE CAPTURE AND CONVERSION TO ORGANIC PRODUCTS

(75) Inventors: Prasad Lakkaraju, East Brunswick, NJ (US); Kyle Teamey, Washington, DC (US)

(73) Assignee: Liquid Light, Inc., Monmouth Junction, NJ (US)

( * ) Notice: Subject to any disclaimer, the term of this patent is extended or adjusted under 35 U.S.C. 154(b) by 0 days.

(21) Appl. No.: 13/541,933

(22) Filed: Jul. 5, 2012

(65) Prior Publication Data

US 2013/0008800 A1    Jan. 10, 2013

Related U.S. Application Data

(60) Provisional application No. 61/504,828, filed on Jul. 6, 2011.

(51) Int. Cl.
*C25B 1/00* (2006.01)
*C25B 3/00* (2006.01)

(52) U.S. Cl.
USPC ........... 205/439; 205/440; 205/448; 205/450; 205/455; 205/462; 205/555

(58) Field of Classification Search
USPC ......... 205/555, 431, 439, 440, 448, 450, 455, 205/462
See application file for complete search history.

(56) References Cited

U.S. PATENT DOCUMENTS

| | | |
|---|---|---|
| 3,019,256 A | 1/1962 | Dunn |
| 3,399,966 A | 9/1968 | Suzuki et al. |
| 3,401,100 A | 9/1968 | Macklin |
| 3,560,354 A | 2/1971 | Young |
| 3,607,962 A | 9/1971 | Krekeler et al. |
| 3,636,159 A | 1/1972 | Solomon |
| 3,720,591 A | 3/1973 | Skarlos |
| 3,745,180 A | 7/1973 | Rennie |
| 3,764,492 A | 10/1973 | Baizer et al. |
| 3,779,875 A | 12/1973 | Michelet |
| 3,899,401 A | 8/1975 | Nohe et al. |

(Continued)

FOREIGN PATENT DOCUMENTS

| | | |
|---|---|---|
| AU | 2012202601 A1 | 5/2012 |
| CA | 2604569 A1 | 10/2006 |

(Continued)

OTHER PUBLICATIONS

Heldebrant et al., "Reversible Zwitterionic Liquids, The Reaction of Alkanol Guanidines, Alkanol Amidines, and Diamines with CO2", Green Chem. (no month, 2010), vol. 12, pp. 713-721.*

(Continued)

*Primary Examiner* — Edna Wong
(74) *Attorney, Agent, or Firm* — Suiter Swantz pc llo

(57) ABSTRACT

Methods and systems for capture of carbon dioxide and electrochemical conversion of the captured carbon dioxide to organic products are disclosed. A method may include, but is not limited to, steps (A) to (C). Step (A) may introduce a solvent to a first compartment of an electrochemical cell. Step (B) may capture carbon dioxide with at least one of guanidine, a guanidine derivative, pyrimidine, or a pyrimidine derivative to form a carbamic zwitterion. Step (C) may apply an electrical potential between an anode and a cathode sufficient for the cathode to reduce the carbamic zwitterion to a product mixture.

8 Claims, 5 Drawing Sheets

(56) References Cited

U.S. PATENT DOCUMENTS

| | | | |
|---|---|---|---|
| 3,959,094 A | 5/1976 | Steinberg | |
| 4,072,583 A | 2/1978 | Hallcher et al. | |
| 4,088,682 A | 5/1978 | Jordan | |
| 4,160,816 A | 7/1979 | Williams et al. | |
| 4,219,392 A | 8/1980 | Halmann | |
| 4,343,690 A | 8/1982 | de Nora | |
| 4,381,978 A | 5/1983 | Gratzel et al. | |
| 4,414,080 A | 11/1983 | Williams et al. | |
| 4,439,302 A | 3/1984 | Wrighton et al. | |
| 4,450,055 A | 5/1984 | Stafford | |
| 4,451,342 A | 5/1984 | Lichtin et al. | |
| 4,460,443 A | 7/1984 | Somorjai et al. | |
| 4,474,652 A | 10/1984 | Brown et al. | |
| 4,476,003 A | 10/1984 | Frank et al. | |
| 4,478,694 A | 10/1984 | Weinberg | |
| 4,478,699 A | 10/1984 | Halmann et al. | |
| 4,595,465 A | 6/1986 | Ang et al. | |
| 4,608,132 A | 8/1986 | Sammells | |
| 4,608,133 A | 8/1986 | Morduchowitz et al. | |
| 4,609,440 A | 9/1986 | Frese, Jr. et al. | |
| 4,609,441 A | 9/1986 | Frese, Jr. et al. | |
| 4,609,451 A | 9/1986 | Sammells et al. | |
| 4,619,743 A | 10/1986 | Cook | |
| 4,620,906 A | 11/1986 | Ang | |
| 4,661,422 A | 4/1987 | Marianowski et al. | |
| 4,668,349 A | 5/1987 | Cuellar et al. | |
| 4,673,473 A | 6/1987 | Ang et al. | |
| 4,702,973 A | 10/1987 | Marianowski | |
| 4,732,655 A | 3/1988 | Morduchowitz et al. | |
| 4,756,807 A | 7/1988 | Meyer et al. | |
| 4,776,171 A | 10/1988 | Perry, Jr. et al. | |
| 4,793,904 A | 12/1988 | Mazanec et al. | |
| 4,824,532 A | 4/1989 | Moingeon et al. | |
| 4,855,496 A | 8/1989 | Anderson et al. | |
| 4,897,167 A | 1/1990 | Cook et al. | |
| 4,902,828 A | 2/1990 | Wickenhaeuser et al. | |
| 4,921,586 A | 5/1990 | Molter | |
| 4,936,966 A | 6/1990 | Garnier et al. | |
| 4,945,397 A | 7/1990 | Schuetz | |
| 4,959,131 A | 9/1990 | Cook et al. | |
| 5,064,733 A | 11/1991 | Krist et al. | |
| 5,198,086 A | 3/1993 | Chlanda et al. | |
| 5,246,551 A | 9/1993 | Pletcher et al. | |
| 5,284,563 A | 2/1994 | Fujihira et al. | |
| 5,290,404 A | 3/1994 | Toomey | |
| 5,382,332 A | 1/1995 | Fujihira et al. | |
| 5,443,804 A | 8/1995 | Parker et al. | |
| 5,514,492 A | 5/1996 | Marincic et al. | |
| 5,587,083 A | 12/1996 | Twardowski | |
| 5,763,662 A | 6/1998 | Ikariya et al. | |
| 5,804,045 A | 9/1998 | Orillon et al. | |
| 5,858,240 A | 1/1999 | Twardowski et al. | |
| 5,928,806 A | 7/1999 | Olah et al. | |
| 6,024,935 A | 2/2000 | Mills et al. | |
| 6,187,465 B1 | 2/2001 | Galloway | |
| 6,251,256 B1 | 6/2001 | Blay et al. | |
| 6,270,649 B1 | 8/2001 | Zeikus et al. | |
| 6,409,893 B1 | 6/2002 | Holzbock et al. | |
| 6,657,119 B2 | 12/2003 | Lindquist et al. | |
| 6,755,947 B2 | 6/2004 | Schulze et al. | |
| 6,777,571 B2 | 8/2004 | Chaturvedi et al. | |
| 6,806,296 B2 | 10/2004 | Shiroto et al. | |
| 6,887,728 B2 | 5/2005 | Miller et al. | |
| 6,906,222 B2 | 6/2005 | Slany et al. | |
| 6,908,497 B1 | 6/2005 | Sirwardane | |
| 6,936,143 B1 | 8/2005 | Graetzel et al. | |
| 6,942,767 B1 | 9/2005 | Fazzina et al. | |
| 7,037,414 B2 | 5/2006 | Fan | |
| 7,052,587 B2 | 5/2006 | Gibson et al. | |
| 7,094,329 B2 | 8/2006 | Saha et al. | |
| 7,314,544 B2 | 1/2008 | Murphy et al. | |
| 7,318,885 B2 | 1/2008 | Omasa | |
| 7,338,590 B1 | 3/2008 | Shelnutt et al. | |
| 7,361,256 B2 | 4/2008 | Henry et al. | |
| 7,378,561 B2 | 5/2008 | Olah et al. | |
| 7,704,369 B2 | 4/2010 | Olah et al. | |
| 7,883,610 B2 | 2/2011 | Monzyk et al. | |
| 8,313,634 B2 * | 11/2012 | Bocarsly et al. | 205/440 |
| 2001/0026884 A1 | 10/2001 | Appleby et al. | |
| 2003/0029733 A1 | 2/2003 | Otsuka et al. | |
| 2004/0089540 A1 | 5/2004 | Van Heuveln et al. | |
| 2005/0011755 A1 | 1/2005 | Jovic et al. | |
| 2005/0011765 A1 | 1/2005 | Omasa | |
| 2005/0051439 A1 | 3/2005 | Jang | |
| 2006/0102468 A1 | 5/2006 | Monzyk et al. | |
| 2006/0235091 A1 | 10/2006 | Olah et al. | |
| 2006/0243587 A1 | 11/2006 | Tulloch et al. | |
| 2007/0004023 A1 | 1/2007 | Trachtenberg et al. | |
| 2007/0012577 A1 | 1/2007 | Bulan et al. | |
| 2007/0045125 A1 | 3/2007 | Hartvigsen et al. | |
| 2007/0054170 A1 | 3/2007 | Isenberg | |
| 2007/0122705 A1 | 5/2007 | Paulsen et al. | |
| 2007/0184309 A1 | 8/2007 | Gust, Jr. et al. | |
| 2007/0224479 A1 | 9/2007 | Tadokoro et al. | |
| 2007/0231619 A1 | 10/2007 | Strobel et al. | |
| 2007/0240978 A1 | 10/2007 | Beckmann et al. | |
| 2007/0254969 A1 | 11/2007 | Olah et al. | |
| 2007/0282021 A1 | 12/2007 | Campbell | |
| 2008/0011604 A1 | 1/2008 | Stevens et al. | |
| 2008/0039538 A1 | 2/2008 | Olah et al. | |
| 2008/0060947 A1 | 3/2008 | Kitsuka et al. | |
| 2008/0072496 A1 | 3/2008 | Yogev et al. | |
| 2008/0090132 A1 | 4/2008 | Ivanov et al. | |
| 2008/0116080 A1 | 5/2008 | Lal et al. | |
| 2008/0145721 A1 | 6/2008 | Shapiro et al. | |
| 2008/0223727 A1 | 9/2008 | Oloman et al. | |
| 2008/0248350 A1 | 10/2008 | Little et al. | |
| 2008/0283411 A1 | 11/2008 | Eastman et al. | |
| 2008/0286643 A1 | 11/2008 | Iwasaki | |
| 2008/0287555 A1 | 11/2008 | Hussain et al. | |
| 2008/0296146 A1 * | 12/2008 | Toulhoat et al. | 204/165 |
| 2009/0014336 A1 | 1/2009 | Olah et al. | |
| 2009/0030240 A1 | 1/2009 | Olah et al. | |
| 2009/0038955 A1 | 2/2009 | Rau | |
| 2009/0061267 A1 | 3/2009 | Monzyk et al. | |
| 2009/0069452 A1 | 3/2009 | Robota | |
| 2009/0134007 A1 | 5/2009 | Solis Herrera | |
| 2009/0277799 A1 | 11/2009 | Grimes | |
| 2010/0084280 A1 | 4/2010 | Gilliam et al. | |
| 2010/0147699 A1 | 6/2010 | Wachsman et al. | |
| 2010/0150802 A1 | 6/2010 | Gilliam et al. | |
| 2010/0180889 A1 | 7/2010 | Monzyk et al. | |
| 2010/0187123 A1 * | 7/2010 | Bocarsly et al. | 205/340 |
| 2010/0187125 A1 | 7/2010 | Sandoval et al. | |
| 2010/0191010 A1 | 7/2010 | Bosman et al. | |
| 2010/0193370 A1 | 8/2010 | Olah et al. | |
| 2010/0196800 A1 | 8/2010 | Markoski et al. | |
| 2010/0213046 A1 | 8/2010 | Grimes et al. | |
| 2010/0248042 A1 | 9/2010 | Nakagawa et al. | |
| 2010/0307912 A1 | 12/2010 | Zommer | |
| 2011/0014100 A1 | 1/2011 | Bara et al. | |
| 2011/0083968 A1 | 4/2011 | Gillliam et al. | |
| 2011/0114501 A1 | 5/2011 | Teamey et al. | |
| 2011/0114502 A1 | 5/2011 | Cole et al. | |
| 2011/0114503 A1 | 5/2011 | Sivasankar et al. | |
| 2011/0114504 A1 | 5/2011 | Sivasankar et al. | |
| 2011/0143929 A1 | 6/2011 | Sato et al. | |
| 2011/0186441 A1 * | 8/2011 | LaFrancois et al. | 205/555 |
| 2011/0226632 A1 | 9/2011 | Cole et al. | |
| 2011/0237830 A1 | 9/2011 | Masel | |
| 2012/0018311 A1 | 1/2012 | Yotsuhashi et al. | |
| 2012/0043301 A1 | 2/2012 | Arvin et al. | |
| 2012/0228147 A1 | 9/2012 | Sivasankar et al. | |
| 2012/0292196 A1 | 11/2012 | Albrecht et al. | |
| 2012/0295172 A1 | 11/2012 | Peled et al. | |
| 2012/0298522 A1 | 11/2012 | Shipchandler et al. | |
| 2012/0329657 A1 | 12/2012 | Eastman et al. | |
| 2013/0062216 A1 | 3/2013 | Yotsuhashi et al. | |
| 2013/0098772 A1 | 4/2013 | Bocarsly et al. | |
| 2013/0105304 A1 | 5/2013 | Kaczur et al. | |
| 2013/0105330 A1 | 5/2013 | Teamey et al. | |
| 2013/0118911 A1 | 5/2013 | Sivasankar et al. | |
| 2013/0134048 A1 | 5/2013 | Teamey et al. | |

(56) References Cited

U.S. PATENT DOCUMENTS

| | | | |
|---|---|---|---|
| 2013/0134049 | A1 | 5/2013 | Teamey et al. |
| 2013/0140187 | A1 | 6/2013 | Teamey et al. |
| 2013/0180863 | A1 | 7/2013 | Kaczur et al. |

FOREIGN PATENT DOCUMENTS

| | | |
|---|---|---|
| DE | 1047765 A | 12/1958 |
| DE | 2301032 A | 7/1974 |
| EP | 0111870 B1 | 12/1983 |
| EP | 0081982 B1 | 5/1985 |
| EP | 0277048 B1 | 3/1988 |
| EP | 0390157 B1 | 5/2000 |
| FR | 853643 | 3/1940 |
| FR | 2780055 A1 | 12/1999 |
| JP | 62120489 A | 6/1987 |
| JP | 64-015388 | 1/1989 |
| JP | 07258877 A | 10/1995 |
| JP | 2004344720 A | 12/2004 |
| JP | 2006188370 A | 7/2006 |
| JP | 2007185096 A | 7/2007 |
| KR | 20040009875 A | 1/2004 |
| WO | WO 9724320 A1 | 7/1997 |
| WO | WO9850974 A1 | 11/1998 |
| WO | WO 0015586 A1 | 3/2000 |
| WO | WO0025380 A2 | 5/2000 |
| WO | WO02059987 A3 | 8/2002 |
| WO | WO 03004727 A2 | 1/2003 |
| WO | WO 2004067673 A1 | 8/2004 |
| WO | 2007041872 A1 | 4/2007 |
| WO | WO2007041872 A1 | 4/2007 |
| WO | WO 2007041872 A1 | 4/2007 |
| WO | WO2007058608 A1 | 5/2007 |
| WO | WO2007119260 A2 | 10/2007 |
| WO | WO2008016728 A2 | 2/2008 |
| WO | WO2008017838 A1 | 2/2008 |
| WO | WO2008124538 A1 | 10/2008 |
| WO | WO2009002566 A1 | 12/2008 |
| WO | WO2009145624 A1 | 12/2009 |
| WO | WO2010010252 A2 | 1/2010 |
| WO | WO2010042197 A1 | 4/2010 |
| WO | WO2010088524 A2 | 8/2010 |
| WO | WO2010138792 A1 | 12/2010 |
| WO | WO2011010109 A1 | 1/2011 |
| WO | WO2011068743 A2 | 6/2011 |
| WO | WO2011120021 A1 | 9/2011 |
| WO | WO2011123907 A1 | 10/2011 |
| WO | WO2011133264 A1 | 10/2011 |
| WO | WO 2012046362 A1 | 4/2012 |

OTHER PUBLICATIONS

Perez et al., "Activation of Carbon Dioxide by Bicyclic Amidines", J. Org. Chem. (no month, 2004), vol. 69, pp. 8005-8011.*

Hori, Kikuchi, and Suzuki; Production of CO and CH4 in Electrochemical Reduction of CO2 at Metal Electrodes in Aqueous Hydrogencarbonate Solution; Chemistry Letters, pp. 1695-1698, 1985. (C) 1985 The Chemical Society of Japan.

Jitaru, Lowy, M. Toma, B.C. Toma, Oniciu; Electrochemical reduction of carbon dioxide on flat metallic cathodes; Journal of Applied Electrochemistry 27 (1997) pp. 875-889, Reviews in Applied Electrochemistry No. 45.

Kaneco, Iwao, Iiba, Itoh, Ohta, and Mizuno; Electrochemical Reduction of Carbon Dioxide on an Indium Wire in a KOH/Methanol-Based Electrolyte at Ambient Temperature and Pressure; Environmental Engineering Science; vol. 16, No. 2, 1999, pp. 131-138.

Todoroki, Hara, Kudo, and Sakata; Electrochemical reduction of high pressure CO2 at Pb, Hg and in electrodes in an aqueous KHCO3 solution; Journal of Electroanalytical Chemistry 394 (1995) 199-203.

R.P.S. Chaplin and A.A. Wragg, Effects of process conditions and electrode material on reaction pathways for carbon dioxide electroreduction with particular reference to formate formation, Journal of Applied Electrochemistry 33: 1107-1123, 2003, Copyright 2003 Kluwer Academic Publishers. Printed in the Netherlands.

Kapusta and Hackerman; The Electroreduction of Carbon Dioxide and Formic Acid on Tin and Indium Electrodes, J. Electrochem. Doc.: Electrochemical Science and Technology, vol. 130, No. 3 Mar. 1983, pp. 607-613.

M. N. Mahmood, D. Masheder, and C. J. Harty; Use of gas-diffusion electrodes for high-rate electrochemical reduction of carbon dioxide. I. Reduction at lead, indium- and tin-impregnated electrodes; Journal of Applied Electrochemistry 17 (1987) 1159-1170.

Y. Hori, Electrochemical CO2 Reduction on Metal Electrodes, Modern Aspects of Electrochemistry, No. 42, edited by C. Vayenas et al., Springer, New York, 2008, pp. 89-189.

Yoshio Hori, Hidetoshi Wakebe, Toshio Tsukamoto and Osamu Koga; Electrocatalytic Process of CO Selectivity in Electrochemical Reductionof CO2 at Metal Electrodes in Aqueous Media; Electrochimica Acta, vol. 39, No. 11/12, pp. 1833-1839, 1994, Copyright 1994 Elsevier Science Ltd., Printed in Great Britain.

Noda, Ikeda, Oda, Imai, Maeda, and Ito; Electrochemical Reduction of Carbon Dioxide at Various Metal Electrodes in Aqueous Potassium Hydrogen Carbonate Solution; Bull. Chem. Soc. Jpn., 63, 2459-2462, 1990, Copyright 1990 The Chemical Society of Japan.

Azuma, Hashimoto, Hiramoto, Watanbe, and Sakata; Carbon dioxide reduction at low temperature on various metal electrodes; J. Electroanal. Chem., 260 (1989) 441-445, Elsevier Sequoia S.A., Lausanne—Printed in The Netherlands.

Vassiliev, Bagotzky, Khazova, and Mayorova; Electroreduction of Carbon Dioxide, Part II. The Mechanism of Reduction in Aprotic Solvents, J. Electroanal. Chem. 189 (1985) 295-309, Elsevier Sequoia S.A., Lausanne—Printed in The Netherlands.

Vassiliev, Bagotzky, Khazova, and Mayorova; Electroreduction of Carbon Dioxide, Part I. The Mechanism and Kinetics of Electroreduction of CO2 in Aqueous Solutions on Metals with High and Moderate Hydrogen Overvoltages, J. Electroanal. Chem. 189 (1985) 271-294, Elsevier Sequoia S.A., Lausanne—Printed in The Netherlands.

Ikeda, Takagi, and Ito; Selective Formation of Formic Acid, Oxalic Acid, and Carbon Monoxide by Electrochemical Reduction of Carbon Dioxide, Bull. Chem. Soc. Jpn., 60, 2517-2522.

Shibata, Yoshida, and Furuya; Electrochemical Synthesis of Urea at Gas-Diffusion Electrodes, IV. Simultaneous Reduction of Carbon Dioxide and Nitrate Ions with Various Metal Catalysts; J. Electrochem. Soc., vol. 145, No. 7, Jul. 1998 The Electrochemical Society, Inc., pp. 2348-2353.

F Richard Keene, Electrochemical and Electrocatalytic Reactions of Carbon Dioxide—Chapter 1: Thermodynamic, Kinetic, and Product Considerations in Carbon Dioxide Reactivity, Elsevier, Amsterdam, 1993, pp. 1-17.

Sammells and Cook, Electrochemical and Electrocatalytic Reactions of Carbon Dioxide—Chapter 7: Electrocatalysis and Novel Electrodes for High Rate CO2 Reduction Under Ambient Conditions, Elsevier, Amsterdam, 1993, pp. 217-262.

W.W. Frese, Jr., Electrochemical and Electrocatalytic Reactions of Carbon Dioxide—Chapter 6: Electrochemical Reduction of CO2 at Solid Electrodes, Elsevier, Amsterdam, 1993, pp. 145-215.

Halmann and Steinberg, Greenhouse gas carbon dioxide mitigation: science and technology—Chapter 11: Photochemical and Radiation-Induced Activation of CO2 in Homogeneous Media, CRC Press, 1999, pp. 391-410.

Halmann and Steinberg, Greenhouse gas carbon dioxide mitigation: science and technology—Chapter 12: Electrochemical Reduction of CO2, CRC Press, 1999, pp. 411-515.

Halmann and Steinberg, Greenhouse gas carbon dioxide mitigation: science and technology—Chapter 13: Photoelectrochemical Reduction of CO2, CRC Press, 1999, pp. 517-527.

Colin Oloman and Hui Li, Electrochemical Processing of Carbon Dioxide, ChemSusChem 2008, 1, 385-391, Copyright 2008 Wiley-VCH Verlag GmbH& Co. KGaA, Weinheim, www.chemsuschem.org.

Hui Li and Colin Oloman, Development of a continuous reactor for the electro-reduction of carbon dioxide to formate—Part 1: Process variables, Journal of Applied Electrochemistry (2006) 36:1105-1115, Copyright Springer 2006.

(56) References Cited

OTHER PUBLICATIONS

Hui Li and Colin Oloman, Development of a continuous reactor for the electro-reduction of carbon dioxide to formate—Part 2: Scale-up, J Appl Electrochem (2007) 37:1107-1117.

Hui Li and Colin Oloman, The electro-reduction of carbon dioxide in a continuous reactor, Journal of Applied Electrochemistry (2005) 35:955-965, Copyright Springer 2005.

PCT International Search Report dated Dec. 13, 2011, PCT/US11/45515, 2 pages.

Andrew P. Doherty, Electrochemical reduction of butraldehyde in the presence of CO2, Electrochimica Acta 47 (2002) 2963-2967, Copyright 2002 Elsevier Science Ltd.

Seshadri, Lin, and Bocarsly; A new homogeneous electrocatalyst for the reduction of carbon dioxide to methanol at low overpotential; Journal of Electroanalytical Chemistry, 372 (1994) 145-150.

PCT International Search Report dated Dec. 15, 2011, PCT/US11/45521, 2 pages.

Fan et al., Semiconductor Electrodes. 27. The p- and n-GaAs-N, N? - Dimet h yl-4,4'- bipyridinium System. Enhancement of Hydrogen Evolution on p-GaAs and Stabilization of n-GaAs Electrodes, Journal of the American Chemical Society, vol. 102, Feb. 27, 1980, pp. 1488-1492.

PCT International Search Report dated Jun. 23, 2010, PCT/US10/22594, 2 pages.

Emily Barton Cole and Andrew B. Bocarsly, Carbon Dioxide as Chemical Feedstock, Chapter 11—Photochemical, Electrochemical, and Photoelectrochemical Reduction of Carbon Dioxide, Copyright 2010 Wiley-VCH Verlag GmbH & Co. KGaA, Weinheim, 26 pages.

Barton Cole, Lakkaraju, Rampulla, Morris, Abelev, and Bocarsly; Using a One-Electron Shuttle for the Multielectron Reduction of CO2 to Methanol: Kinetic, Mechanistic, and Structural Insights; Mar. 29, 2010, 13 pages.

Morris, McGibbon, and Bocarsly; Electrocatalytic Carbon Dioxide Activation: The Rate-Determining Step of Pyridinium-Catalyzed CO2 Reduction; ChemSusChem 2011, 4, 191-196, Copyright 2011 Wiley-VCH Verlag GmbH& Co. KGaA, Weinheim.

Emily Barton Cole, Pyridinium-Catalyzed Electrochemical and Photoelectrochemical Conversion of CO2 to Fuels: A Dissertation Presented to the Faculty of Princeton University in Candidacy for the Degree of Doctor of Philosophy, Nov. 2009, pp. 1-141.

Barton, Rampulla, and Bocarsly; Selective Solar-Driven Reduction of CO2 to Methanol Using a Catalyzed p-GaP Based Photoelectrochemical Cell; Oct. 3, 2007, 3 pages.

Mostafa Hossain, Nagaoka, and Ogura; Palladium and cobalt complexes of substituted quinoline, bipyridine and phenanthroline as catalysts for electrochemical reduction of carbon dioxide; Electrochimica Acta, vol. 42, No. 16, pp. 2577-2585, 1997.

Keene, Creutz, and Sutin; Reduction of Carbon Dioxide by TRIS(2,2' -BIPYRIDINE)COBALT(I), Coordination Chemistry Reviews, 64 (1995) 247-260, Elsevier Science Publishers B.V., Amsterdam—Printed in The Netherlands.

Aurian-Blajeni, Halmann, and Manassen; Electrochemical Measurements on the Photoelectrochemical Reduction of Aqueous Carbon Dioxide on p-Gallium Phosphide and p-Gallium Arsenide Semiconductor Electrodes, Solar Energy Materials 8 (1983) 425-440, North-Holland Publishing Company.

Tan, Zou, and Hu; Photocatalytic reduction of carbon dioxide into gaseous hydrocarbon using TiO2 pellets; Catalysis Today 115 (2006) 269-273.

Bandi and Kuhne, Electrochemical Reduction of Carbon Dioxide in Water: Analysis of Reaction Mechanism on Ruthenium-Titanium-Oxide, J. Electrochem. Soc., vol. 139, No. 6, Jun. 1992 (C) The Electrochemical Society, Inc., pp. 1605-1610.

B. Beden, A. Bewick and C. Lamy, A Study by Electrochemically Modulated Infrared Reflectance Spectroscopy of the Electrosorption of Formic Acid at a Platinum Electrode, J. Electroanal. Chem., 148 (1983) 147-160, Elsevier Sequoia S.A., Lausanne—Printed in The Netherlands.

Bell and Evans, Kinetics of the Dehydration of Methylene Glycol in Aqueous Solution, Proceedings of the Royal Society of London, Series A, Mathematical and Physical Sciences, vol. 291, No. 1426 (Apr. 26, 1966), pp. 297-323.

Bian, Sumi, Furue, Sato, Kolke, and Ishitani; A Novel Tripodal Ligand, Tris[(4'-methyl-2,2'-bipyridyl-4-yl)-methyl]carbinol and Its Trinuclear RuII/ReI Mixed-Metal Complexes: Synthesis, Emission Properties, and Photocatalytic CO2 Reduction; Inorganic Chemistry, vol. 47, No. 23, 2008, pp. 10801-10803.

T. Bundgaard, H. J. Jakobsen, and E. J. Rahkamaa; A High-Resolution Investigation of Proton Coupled and Decoupled 13C FT NMR Spectra of 15N-Pyrrole; Journal of Magnetic Resonance 19,345-356 (1975).

D. Canfield and K. W. Frese, Jr, Reduction of Carbon Dioxide to Methanol on n- and p-GaAs and p-InP. Effect of Crystal Face, Electrolyte and Current Density, Journal of the Electrochemical Society, vol. 130, No. 8, Aug. 1983, pp. 1772-1773.

Arakawa, et al., Catalysis Research of Relevance to Carbon Management: Progress, Challenges, and Opportunities, Chem. Rev. 2001, 101, 953-996.

Chang, Ho, and Weaver; Applications of real-time infrared spectroscopy to electrocatalysis at bimetallic surfaces, I. Electrooxidation of formic acid and methanol on bismuth-modified Pt(111) and Pt(100), Surface Science 265 (1992) 81-94.

S. Clarke and J. A. Harrison, The Reduction of Formaldehyde, Electroanalytical Chemistry and Interfacial Electrochemistry , J. Electroanal. Chem., 36 (1972), pp. 109-115, Elsevier Sequoia S.A., Lausanne Printed in The Netherlands.

Li, Markley, Mohan, Rodriguez-Santiago, Thompson, and Van Niekerk; Utilization of Carbon Dioxide From Coal-Fired Power Plant for the Production of Value-Added Products; Apr. 27, 2006, 109 pages.

Cook, MacDuff, and Sammells; High Rate Gas Phase CO2 Reduction to Ethylene and Methane Using Gas Diffusion Electrodes, J. Electrochem. Soc., vol. 137, No. 2, pp. 607-608, Feb. 1990, © The Electrochemical Society, Inc.

Daube, Harrison, Mallouk, Ricco, Chao, Wrighton, Hendrickson, and Drube; Electrode-Confined Catalyst Systems for Use in Optical-to-Chemical Energy Conversion; Journal of Photochemistry, vol. 29, 1985, pp. 71-88.

Dewulf, Jin, and Bard; Electrochemical and Surface Studies of Carbon Dioxide Reduction to Methane and Ethylene at Copper Electrodes in Aqueous Solutions; J. Electrochem. Soc., vol. 136, No. 6, Jun. 1989, pp. 1686-1691, © The Electrochemical Society, Inc.

J. Augustynski, P. Kedzierzawski, and B. Jermann, Electrochemical Reduction of CO2 at Metallic Electrodes, Studies in Surface Science and Catalysis, vol. 114, pp. 107-116, © 1998 Elsevier Science B.V.

Sung-Woo Lee, Jea-Keun Lee, Kyoung-Hag Lee, and Jun-Heok Lim, Electrochemical reduction of CO and H2 from carbon dioxide in aqua-solution, Current Applied Physics, vol. 10, 2010, pp. S51-S54.

Andrew P. Abbott and Christopher A. Eardley, Electrochemical Reduction of CO2 in a Mixed Supercritical Fluid, J. Phys. Chem. B, 2000, vol. 104, pp. 775-779.

Matthew R. Hudson, Electrochemical Reduction of Carbon Dioxide, Dec. 9, 2005, pp. 1-15.

S. Kapusta and N. Hackerman, The Electroreduction of Carbon Dioxide and Formic Acid on Tin and Indium Electrodes, J. Electrochem. Soc.: Electrochemical Science and Technology, Mar. 1983, pp. 607-613.

M Aulice Scibioh and B Viswanathan, Electrochemical Reduction of Carbon Dioxide: A Status Report, Proc Indian Natn Sci Acad, vol. 70, A, No. 3, May 2004, pp. 1-56.

N. L. Weinberg, D. J. Mazur, Electrochemical hydrodimerization of formaldehyde to ethylene glycol, Journal of Applied Electrochemistry, vol. 21, 1991, pp. 895-901.

R.P.S. Chaplin and A.A. Wragg, Effects of process conditions and electrode material on reaction pathways for carbon dioxide electroreduction with particular reference to formate formation, Journal of Applied Electrochemistry vol. 33, pp. 1107-1123, 2003, © 2003 Kluwer Academic Publishers. Printed in the Netherlands.

M.N. Mahmood, D. Masheder, and C.J. Harty, Use of gas-diffusion electrodes for high-rate electrochemical reduction of carbon dioxide.

(56) References Cited

OTHER PUBLICATIONS

I. Reduction at lead, indium- and tin-impregnated electrodes, Journal of Applied Electrochemistry, vol. 17, 1987, pp. 1159-1170.
Summers, Leach, and Frese, The Electrochemical Reduction of Aqueous Carbon Dioxide to Methanol at Molybdenum Electrodes with Low Overpotentials, J. Electroanal. Chem., vol. 205, 1986, pp. 219-232, Elseiver Sequoia S.A., Lausanne—Printed in The Netherlands.
Frese and Leach, Electrochemical Reduction of Carbon Dioxide to Methane, Methanol, and CO on Ru Electrodes, Journal of the Electrochemical Society, Jan. 1985, pp. 259-260.
Frese and Canfield, Reduction of CO2 on n-GaAs Electrodes and Selective Methanol Synthesis, J. Electrochem. Soc.: Electrochemical Science and Technology, vol. 131, No. 11, Nov. 1984, pp. 2518-2522.
Shibata, Yoshida, and Furuya, Electrochemical Synthesis of Urea at Gas-Diffusion Electrodes, J. Electrochem. Soc., vol. 145, No. 2, Feb. 1998, © The Electrochemical Society, Inc., pp. 595-600.
Shibata and Furuya, Simultaneous reduction of carbon dioxide and nitrate ions at gas-diffusion electrodes with various metal-lophthalocyanine catalysts, Electrochimica Acta 48, 2003, pp. 3953-3958.
M. Gattrell, N. Gupta, and A. CO, A Review of the aqueous electrochemical reduction of CO2 to hydrocarbons at copper, Journal of Electroanalytical Chemistry, vol. 594, 2006, pp. 1-19.
Mahmood, Masheder, and Harty; Use of Gas-Diffusion Electrodes for High-Rate Electrochemical Reduction of Carbon Dioxide. II. Reduction at Metal Phthalocyanine-impregnated Electrodes; Journal of Applied Electrochemistry, vol. 17, 1987, pp. 1223-1227.
Gennaro, Isse, Saveant, Severin, and Vianello; Homogeneous Electron Transfer Catalysis of the Electrochemical Reduction of Carbon Dioxide. Do Aromatic Anion Radicals React in an Outer-Sphere Manner?; J. Am. Chem. Soc., 1996, vol. 118, pp. 7190-7196.
J. Giner, Electrochemical Reduction of CO2 on Platinum Electrodes in Acid Solutions, Electrochimica Acta, 1963, vol. 8, pp. 857-865, Pregamon Press Ltd., Printed in Northern Ireland.
John Leonard Haan, Electrochemistry of Formic Acid and Carbon Dioxide on Metal Electrodes with Applications to Fuel Cells and Carbon Dioxide Conversion Devices, 2010, pp. 1-205.
M. Halmann, Photoelectrochemical reduction of aqueous carbon dioxide on p-type gallium phosphide in liquid junction solar cells, Nature, vol. 275, Sep. 14, 1978, pp. 115-116.
H. Ezaki, M. Morinaga, and S. Watanabe, Hydrogen Overpotential for Transition Metals and Alloys, and its Interpretation Using an Electronic Model, Electrochimica Acta, vol. 38, No. 4, 1993, pp. 557-564, Pergamon Press Ltd., Printed in Great Britain.
K.S. Udupa, G.S. Subramanian, and H.V.K. Udupa, The Electrolytic Reduction of Carbon Dioxide to Formic Acid, Electrochimica Acta, 1971, vol. 16, pp. 1593-1598, Pergamon Press., Printed in Northern Ireland.
Ougitani, Aizawa, Sonoyama, and Sakata; Temperature Dependence of the Probability of Chain Growth for Hydrocarbon Formation by Electrochemical Reduction of CO2, Bull. Chem. Soc. Jpn., vol. 74, pp. 2119-2122, 2001.
Furuya, Yamazaki, and Shibata; High performance Ru-Pd catalysts for CO2 reduction at gas-diffusion electrodes, Journal of Electroanalytical Chemistry, vol. 431, 1997, pp. 39-41.
R. Hinogami, Y. Nakamura, S. Yae, and Y. Nakato; An Approach to Ideal Semiconductor Electrodes for Efficient Photoelectrochemical Reduction of Carbon Dioxide by Modification with Small Metal Particles, J. Phys. Chem. B, 1998, vol. 102, pp. 974-980.
Reda, Plugge, Abram, and Hirst; Reversible interconversion of carbon dioxide and formate by an electroactive enzyme, PNAS, Aug. 5, 2008, vol. 105, No. 31, pp. 10654-10658, www.pnas.org/cgi/doi/10.1073pnas.0801290105.
Hori, Yoshio; Suzuki, Shin, Cathodic Reduction of Carbon Dioxide for Energy Storage, Journal of the Research Institute for Catalysis Hokkaido University, 30(2): 81-88, Feb. 1983, http://hdl.handle.net/2115/25131.
Hori, Wakebe, Tsukamoto, and Koga; Electrocatalytic Process of CO Selectivity in Electrochemical Reduction of CO2 at Metal Electrodes in Aqueous Media, Electrochimica Acta, vol. 39, No. 11/12, pp. 1833-1839, 1994, Copyright 1994 Elsevier Science Ltd.,Pergamon, Printed in Great Britain.
Hori, Kikuchi, and Suzuki; Production of CO and CH4 in Electrochemical Reduction of CO2 at Metal Electrodes in Aqueous Hydrogencarbonate Solution; Chemistry Letters, 1985, pp. 1695-1698, Copyright 1985 The Chemical Society of Japan.
Hori, Kikuchi, Murata, and Suzuki; Production of Methane and Ethylene in Electrochemical Reduction of Carbon Dioxide at Copper Electrode in Aqueous Hydrogencarbonate Solution; Chemistry Letters, 1986, pp. 897-898, Copyright 1986 The Chemical Society of Japan.
Hoshi, Suzuki, and Hori; Step Density Dependence of CO2 Reduction Rate on Pt(S)-[n(111) x (111)] Single Crystal Electrodes, Electrochimica Acta, vol. 41, No. 10, pp. 1617-1653, 1996, Copyright 1996 Elsevier Science Ltd. Printed in Great Britain.
Hoshi, Suzuki, and Hori; Catalytic Activity of CO2 Reduction on Pt Single-Crystal Electrodes: Pt(S)-[n(111)x(111)], Pt(S)-[n(111)x(100)], and Pt(S)-[n(100)x(111)], J. Phys. Chem. B, 1997, vol. 101, pp. 8520-8524.
Ikeda, Saito, Yoshida, Noda, Maeda, and ITO; Photoelectrochemical reduction products of carbon dioxide at metal coated p-GaP photocathodes in non-aqueous electrolytes, J. Electroanal. Chem., 260 (1989) pp. 335-345, Elsevier Sequoia S.A., Lausanne—Printed in The Netherlands.
Noda, Ikeda, Oda, Imai, Maeda, and Ito; Electrochemical Reduction of Carbon Dioxide at Various Metal Electrodes in Aqueous Potassium Hydrogen Carbonate Solution, Bull. Chem. Soc. Jpn., 63, pp. 2459-2462, 1990, Copyright 1990 The Chemical Society of Japan.
S.R. Narayanan, B. Haines, J. Soler, and T.I. Valdez; Electrochemical Conversion of Carbon Dioxide to Formate in Alkaline Polymer Electrolyte Membrane Cells, Journal of The Electrochemical Society, 158 (2) A167-A173 (2011).
Tooru Inoue, Photoelectrocatalytic reduction of carbon dioxide in aqueous suspensions of semiconductor powders, Nature, vol. 277, Feb. 22, 1979, pp. 637-638.
B. Jermann and J. Augustynski, Long-Term Activation of the Copper Cathode in the Course of CO2 Reduction, Electrochimica Acta, vol. 39, No. 11/12, pp. 1891-1896, 1994, Elsevier Science Ltd., Printed in Great Britain.
Jitaru, Lowy, M. Toma, B.C. Toma, and L. Oniciu; Electrochemical reduction of carbon dioxide on flat metallic cathodes; Journal of Applied Electrochemistry 27 (1997) 875-889, Reviews in Applied Electrochemistry No. 45.
Maria Jitaru, Electrochemical Carbon Dioxide Reduction-Fundamental and Applied Topics (Review), Journal of the University of Chemical Technology and Metallurgy, 42, 4, 2007, 333-344.
Kaneco, Katsumata, Suzuki, and Ohta; Photoelectrocatalytic reduction of CO2 in LiOH/methanol at metal-modified p-InP electrodes, Applied Catalysis B: Environmental 64 (2006) 139-145.
J.J. Kim, D.P. Summers, and K.W. Frese, Jr; Reduction of CO2 and CO to Methane on Cu Foil Electrodes, J. Electroanal. Chem., 245 (1988) 223-244, Elsevier Sequoia S.A., Lausanne—Printed in The Netherlands.
Osamu Koga and Yoshio Hori, Reduction of Adsorbed CO on a Ni Electrode in Connection With the Electrochemical Reduction of CO2, Electrochimica Acta, vol. 38, No. 10, pp. 1391-1394,1993, Printed in Great Britain.
Breedlove, Ferrence, Washington, and Kubiak; A photoelectrochemical approach to splitting carbon dioxide for a manned mission to Mars, Materials and Design 22 (2001) 577-584, © 2001 Elsevier Science Ltd.
Simon-Manso and Kubiak, Dinuclear Nickel Complexes as Catalysts for Electrochemical Reduction of Carbon Dioxide, Organometallics 2005, 24, pp. 96-102, © 2005 American Chemical Society.
Kushi, Nagao, Nishioka, Isobe, and Tanaka; Remarkable Decrease in Overpotential of Oxalate Formation in Electrochemical C02 Reduction by a Metal-Sulfide Cluster, J. Chem. Soc., Chem. Commun., 1995, pp. 1223-1224.
Kuwabata, Nishida, Tsuda, Inoue, and Yoneyama; Photochemical Reduction of Carbon Dioxide to Methanol Using ZnS Microcrystal-

(56) References Cited

OTHER PUBLICATIONS lite as a Photocatalyst in the Presence of Methanol Dehydrogenase, J. Electrochem. Soc., vol. 141, No. 6, pp. 1498-1503, Jun. 1994, © The Electrochemical Society, Inc.

Hara et al., "Electrochemical Reduction of Carbon Dioxide Under High Pressure on Various Electrodes in an Aqueous Electrolyte", Journal of Electroanalytical Chemistry (no month, 1995), vol. 391, pp. 141-147.

Yamamoto et al., "Production of Syngas Plus Oxygen From CO2 in a Gas-Diffusion Electrode-Based Electrolytic Cell", Electrochimica Acta (no month, 2002), vol. 47, pp. 3327-3334.

Seshadri et al., "A New Homogeneous Electrocatalyst for the Reduction of Carbon Dioxide to Menthanol at Low Overpotential", Journal of Electroanalytical Chemistry, 372 pp. 145-150, Jul. 8, 1994, figure 1; p. 146-147.

Doherty, "Electrochemical Reduction of Butyraldehyde in the Presence of CO2", Electrochimica Acta 47(2002) 2963-2967.

Udupa et al., "The Electrolytic Reduction of Carbon Dioxide to Formic Acid", Electrochimica Acta (no month, 1971), vol. 16, pp. 1593-1598.

Jitaru, Maria, "Electrochemical Carbon Dioxide Reduction" - Fundamental and Applied Topics (Review), Journal of the University of Chemical Technology and Metallurgy (2007), vol. 42, No. 4, pp. 333-344.

Sloop et al., "The Role of Li-ion Battery Electrolyte Reactivity in Performance Decline and Self-Discharge", Journal of Power Sources (no month, 2003), vols. 119-121, pp. 330-337.

Shibata, Masami, et al., "Electrochemical Synthesis of Urea at Gas-Diffusion Electrodes", J. Electrochem. Soc., vol. 145, No. 2, Feb. 1998, pp. 595-600, The Electrochemical Society, Inc.

Shibata, Masami, et al., "Simultaneous Reduction of Carbon Dioxide and Nitrate Ions at Gas-Diffusion Electrodes with Various Metallophthalocyanine Catalysts", From a paper presented at the 4th International Conference on Electrocatalysis: From Theory to Industrial Applications, Sep. 22-25, 2002, Como, Italy, Electrochimica Acta 48 (2003) 3959-3958.

Harrison et al., "The Electrochemical Reduction of Organic Acids", Electroanalytical Chemistry and Interfacial Electrochemistry (no month, 1971), vol. 32, No. 1, pp. 125-135.

Chauhan et al., "Electro Reduction of Acetophenone in Pyridine on a D.M.E.", J Inst. Chemists (India) [Jul. 1983], vol. 55, No. 4, pp. 147-148.

Hori et al, chapter on "Electrochemical CO2 Reduction on Metal Electrodes," in the book Modern Aspects of Electrochemistry, vol. 42, pp. 106 and 107.

Jitaru, Lowy, Toma, Toma and Oniciu, "Electrochemical Reduction of Carbon Dioxide on Flat Metallic Cathodes," Journal of Applied Electrochemistry, 1997, vol. 27, p. 876.

Popic, Avramov, and Vukovic, "Reduction of Carbon Dioxide on Ruthenium Oxide and Modified Ruthenium Oxide Electrodes in 0.5M NaHCO3," Journal of Electroanalytical Chemistry, 1997, vol. 421, pp. 105-110.

Eggins and McNeill, "Voltammetry of Carbon Dioxide. I. A General Survey of Voltammetry at Different Electrode Materials in Different Solvents," Journal of Electroanalytical Chemistry, 1983, vol. 148, pp. 17-24.

Kostecki and Augustynski, "Electrochemical Reduction of CO2 at an Active Silver Electrode," Ber. Busenges. Phys. Chem., 1994, vol. 98, pp. 1510-1515.

Non-Final Office Action for U.S. Appl. No. 12/846,221, dated Nov. 21, 2012.

Non-Final Office Action for U.S. Appl. No. 12/846,011, dated Aug. 29, 2012.

Non-Final Office Action for U.S. Appl. No. 12/846,002, dated Sep. 11, 2012.

Non-Final Office Action for U.S. Appl. No. 12/845,995, dated Aug. 13, 2012.

Final Office Action for U.S. Appl. No. 12/845,995, dated Nov. 28, 2012.

Non-Final Office Action for U.S. Appl. No. 12/696,840, dated Jul. 9, 2012.

Non-Final Office Action for U.S. Appl. No. 13/472,039, dated Sep. 13, 2012.

DNV (Det Norske Veritas), Carbon Dioxide Utilization, Electrochemical Conversion of CO2—Opportunities and Challenges, Research and Innovation, Position Paper, Jul. 2011.

Matthew R. Hudson, Electrochemical Reduction of Carbon Dioxide, Department of Chemistry, State University of New York at Potsdam, Potsdam New York 13676, pp. 1-15, Dec. 9, 2005.

Colin Oloman and Hui Li, Electrochemical Processing of Carbon Dioxide, ChemSusChem 2008, 1, 385-391, (c) 2008 Wiley-VCH Verlag GmbH& Co. KGaA, Weinheim, www.chemsuschem.org.

R.P.S. Chaplin and A.A. Wragg; Effects of Process Conditions and Electrode Material on Reaction Pathways for Carbon Dioxide Electroreduction with Particular Reference to Formate Formation; Journal of Applied Electrochemistry 33: pp. 1107-1123, 2003; © 2003 Kluwer Academic Publishers. Printed in the Netherlands.

Akahori, Iwanaga, Kato, Hamamoto, Ishii; New Electrochemical Process for CO2 Reduction to from Formic Acid from Combustion Flue Gases; Electrochemistry; vol. 4; pp. 266-270.

Ali, Sato, Mizukawa, Tsuge, Haga, Tanaka; Selective formation of HCO2- and C2042- in electrochemical reduction of CO2 catalyzed by mono- and di-nuclear ruthenium complexes; Chemistry Communication; 1998; Recieved in Cambridge, UK, 13th Oct. 1997; 7/07363A; pp. 249-250.

Wang, Maeda, Thomas, Takanabe, Xin, Carlsson, Domen, Antonietti; A metal-free polymeric photocatalyst for hydrogen production from water under visible light; Nature Materials; Published Online Nov. 9, 2008; www.nature.com/naturematerials; pp. 1-5.

Aresta and Dibenedetto; Utilisation of CO2 as a Chemical Feedstock: Opportunities and Challenges; Dalton Transactions; 2007; pp. 2975-2992; © The Royal Society of Chemistry 2007.

B. Aurian-Blajeni, I. Taniguchi, and J. O'M. Bockris; Photoelectrochemical Reduction of Carbon Dioxide Using Polyaniline-Coated Silicon; J. Electroanal. Chem.; vol. 149; 1983; pp. 291-293; Elsevier Sequoia S.A., Lausanne, Printed in The Netherlands.

Azuma, Hashimoto, Hiramoto, Watanabe, Sakata; Electrochemical Reduction of Carbon Dioxide on Various Metal Electrodes in Low-Temperature Aqueous KHCO3 Media; J. Electrochem. Soc., vol. 137, No. 6, Jun. 1990 © The Electrochemical Society, Inc.

Bandi and Kuhne; Electrochemical Reduction of Carbon Dioxide in Water: Analysis of Reaction Mechanism on Ruthenium-Titanium-Oxide; J. Electrochem. Soc., vol. 139, No. 6, Jun. 1992 © The Electrochemical Society, Inc.

Beley, Collin, Sauvage, Petit, Chartier; Photoassisted Electro-Reduction of CO2 On p-GaAs In thePresence of Ni Cyclam; J. Electroanal. Chem. vol. 206, 1986, pp. 333-339, Elsevier Sequoia S.A., Lausanne, Printed in The Netherlands.

Benson, Kubiak, Sathrum, and Smieja; Electrocatalytic and homogeneous approaches to conversion of CO2 to liquid fuels; Chem. Soc. Rev., 2009, vol. 38, pp. 89-99, © The Royal Society of Chemistry 2009.

Taniguchi, Aurian-Blajeni, and Bockris; The Mediation of the Photoelectrochemical Reduction of Carbon Dioxide by Ammonium Ions; J. Electroanal. Chem., vol. 161, 1984, pp. 385-388, Elsevier Sequoia S.A., Lausanne-Printed in The Netherlands.

Bockris and Wass; The Photoelectrocatalytic Reduction of Carbon Dioxide; J. Electrochem. Soc., vol. 136, No. 9, Sep. 1989, pp. 2521-2528, © The Electrochemical Society, Inc.

Carlos R. Cabrera and Hector D. Abruna; Electrocatalysis of CO2 Reduction at Surface Modified Metallic and Semiconducting Electrodes; J. Electroanal. Chem. vol. 209, 1986, pp. 101-107, Elesevier Sequoia S.A., Lausanne—Printed in The Netherlands, © 1986 Elsevier Sequoia S.A.

D. Canfield and K.W. Frese, Jr.; Reduction of Carbon Dioxide to Methanol on n- and p-GaAs and p-InP . Effect of Crystal Face, Electrolyte and Current Density; Journal of the Electrochemical Society; Aug. 1983; pp. 1772-1773.

Huang, Lu, Zhao, Li, and Wang; The Catalytic Role of N-Heterocyclic Carbene in a Metal-Free Conversion of Carbon Dioxide into

(56) References Cited

OTHER PUBLICATIONS

Methanol: A Computational Mechanism Study; J. Am. Chem. Soc. 2010, vol. 132, pp. 12388-12396, © 2010 American Chemical Society.
Arakawa, et al., Catalysis Research of Relevance to Carbon Management: Progress, Challenges, and Opportunities; Chem. Rev. 2001, vol. 101, pp. 953-996.
Cheng, Blaine, Hill, and Mann; Electrochemical and IR Spectroelectrochemical Studies of the Electrocatalytic Reduction of Carbon Dioxide by [Ir2(dimen)4]2+ (dimen = 1,8-Diisocyanomenthane), Inorg. Chem. 1996, vol. 35, pp. 7704-7708, © 1996 American Chemical Society.
Stephen K. Ritter; What Can We Do With Carbon Dioxide?, Chemical & Engineering News, Apr. 30, 2007, vol. 85, No. 18, pp. 11-17, http://pubs.acs.org/cen/coverstory/85/8518cover.html.
J. Beck, R. Johnson, and T. Naya; Electrochemical Conversion of Carbon Dioxide to Hydrocarbon Fuels, EME 580 Spring 2010, pp. 1-42.
Aydin and Koleli, Electrochemical reduction of CO2 on a polyaniline electrode under ambient conditions and at high pressure in methanol, Journal of Electroanalytical Chemistry vol. 535 (2002) pp. 107-112, www.elsevier.com/locate/jelechem.
Lee, Kwon, Machunda, and Lee; Electrocatalytic Recycling of CO2 and Small Organic Molecules; Chem. Asian J. 2009, vol. 4, pp. 1516-1523, © 2009 Wiley-VCH Verlag GmbH&Co. KGaA, Weinheim.
Etsuko Fujita, Photochemical CO2 Reduction: Current Status and Future Prospects, American Chemical Society's New York Section, Jan. 15, 2011, pp. 1-29.
Toshio Tanaka, Molecular Orbital Studies on the Two-Electron Reduction of Carbon Dioxide to Give Formate Anion, Memiors of Fukui University of Technology, vol. 23, Part 1, 1993, pp. 223-230.
A. Bewick and G.P. Greener, The Electroreduction of CO2 to Glycollate on a Lead Cathode, Tetrahedron Letters No. 5, pp. 391-394, 1970, Pergamon Press, Printed in Great Britain.
Centi, Perathoner, Wine, and Gangeri, Electrocatalytic conversion of CO2 to long carbon-chain hydrocarbons, Green Chem., 2007, vol. 9, pp. 671-678, © The Royal Society of Chemistry 2007.
A. Bewick and G.P. Greener, The Electroreduction of CO2 to Malate on a Mercury Cathode, Tetrahedron Letters No. 53, pp. 4623-4626, 1969, Pergamon Press, Printed in Great Britain.
Eggins, Brown, McNeill, and Grimshaw, Carbon Dioxide Fixation by Electrochemical Reduction in Water to Oxalate and Glyoxylate, Tetrahedron Letters vol. 29, No. 8, pp. 945-948, 1988, Pergamon Journals Ltd., Printed in Great Britain.
Jean-Marie Lehn and Raymond Ziessel, Photochemical generation of carbon monoxide and hydrogen by reduction of carbon dioxide and water under visible light irradiation, Proc. Natl. Acad. Sci. USA, vol. 79, pp. 701-704, Jan. 1982, Chemistry.
Li and Prentice, Electrochemical Synthesis of Methanol from CO2 in High-Pressure Electrolyte, J. Electrochem. Soc., vol. 144, No. 12, Dec. 1997 © The Electrochemical Society, Inc., pp. 4284-4288.
Azuma, Hashimoto, Hiramoto, Watanabe, and Sakata; Carbon dioxide reduction at low temperature on various metal electrodes, J. Electroanal. Chem., 260 (1989) 441-445, Elsevier Sequoia S.A., Lausanne—Printed in The Netherlands.
Goettmann, Thomas, and Antonietti; Metal-Free Activation of CO2 by Mesoporous Graphitic Carbon Nitride; Angewandte Chemie; Angew. Chem. Int. Ed. 2007, 46, 2717-2720.
Yu Vassiliev, V S Bagotzky, O.A. Khazova and Na Mayorova; Electroreduction of Carbon Dioxide Part II. The Mechanism of Reduction in Aprotic Solvents, J Electroanal. Chem, 189 (1985) 295-309 Elsevier Sequoia S.A. , Lausanne—Printed in The Netherlands.
Whipple, Finke, and Kenis; Microfluidic Reactor for the Electrochemical Reduction of Carbon Dioxide: The Effect of pH; Electrochemical and Solid-State Letters, 13 (9) B109-B111 (2010), 1099-0062/2010/13(9)/B109/3/$28.00 © The Electrochemical Society.
Zhai, Chiachiarelli, and Sridhar; Effects of Gaseous Impurities on the Electrochemical Reduction of CO2 on Copper Electrodes; ECS Transactions, 19 (14) 1-13 (2009), 10.1149/1.3220175 © The Electrochemical Society.
R.D.L. Smith, P.G. Pickup, Nitrogen-rich polymers for the electrocatalytic reduction of CO2, Electrochem. Commun. (2010), doi:10.1016/j.elecom.2010.10.013.
B.Z. Nikolic, H. Huang, D. Gervasio, A. Lin, C. Fierro, R.R. Adzic, and E.B. Yeager; Electroreduction of carbon dioxide on platinum single crystal electrodes: electrochemical and in situ FTIR studies; J. Electmanal. Chem., 295 (1990) 415-423; Elsevier Sequoia S.A., Lausanne.
Nogami, Itagaki, and Shiratsuchi; Pulsed Electroreduction of CO2 on Copper Electrodes-II; J. Electrochem. Soc., vol. 141, No. 5, May 1994 © The Electrochemical Society, Inc., pp. 1138-1142.
Ichiro Oda, Hirohito Ogasawara, and Masatoki Ito; Carbon Monoxide Adsorption on Copper and Silver Electrodes during Carbon Dioxide Electroreduction Studied by Infrared Reflection Absorption Spectroscopy and Surface-Enhanced Raman Spectroscopy; Langmuir 1996, 12, 1094-1097.
Kotaro Ogura,, Kenichi Mine, Jun Yano, and Hideaki Sugihara; Electrocatalytic Generation of C2 and C3 Compounds from Carbon Dioxide on a Cobalt Complex-immobilized Dual-film Electrode; J . Chem. Soc., Chem. Commun., 1993, pp. 20-21.
Ohkawa, Noguchi, Nakayama, Hashimoto, and Fujishima; Electrochemical reduction of carbon dioxide on hydrogen-storing materials Part 3. The effect of the absorption of hydrogen on the palladium electrodes modified with copper; Journal of Electroanalytical Chemistry, 367 (1994) 165-173.
Sanchez-Sanchez, Montiel, Tryk, Aldaz, and Fujishima; Electrochemical approaches to alleviation of the problem of carbon dioxide accumulation; Pure Appl. Chem., vol. 73, No. 12, pp. 1917-1927, 2001, © 2001 IUPAC.
D. J. Pickett and K. S. Yap, A study of the production of glyoxylic acid by the electrochemical reduction of oxalic acid solutions, Journal of Applied Electrochemistry 4 (1974) 17-23, Printed in Great Britain, © 1974 Chapman and Hall Ltd.
Bruce A. Parkinson & Paul F. Weaver, Photoelectrochemical pumping of enzymatic CO2 reduction, Nature, vol. 309, May 10, 1984, pp. 148-149.
Paul, Tyagi, Bilakhiya, Bhadbhade, Suresh, and Ramachandraiah; Synthesis and Characterization of Rhodium Complexes Containing 2,4,6-Tris(2-pyridyl)-1,3,5-triazine and Its Metal-Promoted Hydrolytic Products: Potential Uses of the New Complexes in Electrocatalytic Reduction of Carbon Dioxide; Inorg. Chem. 1998, 37, 5733-5742.
Furuya, Yamazaki, and Shibata; High performance Ru-Pd catalysts for CO2 reduction at gas-diffusion electrodes, Journal of Electroanalytical Chemistry 431 (1997) 39-41.
Petit, Chartier, Beley, and Deville; Molecular catalysts in photoelectrochemical cells Study of an efficient system for the selective photoelectroreduction of CO2: p-GaP or p-GaAs / Ni( cyclam) 2+, aqueous medium; J. Electroanal. Chem., 269 (1989) 267-281; Elsevier Sequoia S.A., Lausanne—Printed in The Netherlands.
Popic, Avramov-Ivic, and Vukovic; Reduction of carbon dioxide on ruthenium oxide and modified ruthenium oxide electrodes in 0.5 M NaHCO3, Journal of Electroanalytical Chemistry 421 (1997) 105-110.
Whipple and Kenis, Prospects of CO2 Utilization via Direct Heterogeneous Electrochemical Reduction, J. Phys. Chem. Lett. 2010, 1, 3451-3458, © 2010 American Chemical Society.
P.A. Christensen & S.J. Higgins, Preliminary note the electrochemical reduction of CO2 to oxalate at a Pt electrode immersed in acetonitrile and coated with polyvinylalcohol/[Ni(dppm)2CI2], Journal of Electroanalytical Chemistry, 387 (1995) 127-132.
Qu, Zhang, Wang, and Xie; Electrochemical reduction of CO2 on RuO2/TiO2 nanotubes composite modified Pt electrode, Electrochimica Acta 50 (2005) 3576-3580.
Jin, Gao, Jin, Zhang, Cao, ; Wei, and Smith; High-yield reduction of carbon dioxide into formic acid by zero-valent metal/metal oxide redox cycles; Energy Environ. Sci., 2011, 4, pp. 881-884.
Yu B Vassiliev, V S Bagotzky. N V Osetrova and A A Mikhailova; Electroreduction of Carbon Dioxide Part III. Adsorption and Reduc-

(56) References Cited

OTHER PUBLICATIONS tion of CO2 on Platinum Metals; J Electroanal Chem. 189 (1985) 311-324, Elsevier Sequoia SA, Lausanne—Printed in The Netherlands.

M. Gattrell, N. Gupta, and A. CO; A review of the aqueous electrochemical reduction of CO2 to hydrocarbons at copper; Journal of Electroanalytical Chemistry 594 (2006) 1-19.

Hoshi, Ito, Suzuki, and Hori; Preliminary note CO 2 Reduction on Rh single crystal electrodes and the structural effect; Journal of Electroanalytical Chemistry 395 (1995) 309-312.

Rudolph, Dautz, and Jager; Macrocyclic [N42-] Coordinated Nickel Complexes as Catalysts for the Formation of Oxalate by Electrochemical Reduction of Carbon Dioxide; J. Am. Chem. Soc. 2000, 122, 10821-10830, Published on Web Oct. 21, 2000.

Ryu, Andersen, and Eyring; The Electrode Reduction Kinetics of Carbon Dioxide in Aqueous Solution; The Journal of Physical Chemistry, vol. 76, No. 22, 1972, pp. 3278-3286.

Zhao, Jiang, Han, Li, Zhang, Liu, Hi, and Wu; Electrochemical reduction of supercritical carbon dioxide in ionic liquid 1-n-butyl-3-methylimidazolium hexafluorophosphate; J. of Supercritical Fluids 32 (2004) 287-291.

Schwartz, Cook, Kehoe, MacDuff, Patel, and Sammells; Carbon Dioxide Reduction to Alcohols using Perovskite-Type Electrocatalysts; J. Electrochem. Soc., vol. 140, No. 3, Mar. 1993 © The Electrochemical Society, Inc., pp. 614-618.

Ikeda, Takagi, and Ito; Selective Formation of Formic Acid, Oxalic Acid, and Carbon Monoxide by Electrochemical Reduction of Carbon Dioxide; Bull. Chem. Soc. Jpn., 60, 2517-2522 (1987) © 1987 The Chemical Society of Japan.

Shiratsuchi, Aikoh, and Nogami; Pulsed Electroreduction of CO2 on Copper Electrodes; J, Electrochem. Soc., vol. 140, No. 12, Dec. 1993 © The Electrochemical Society, Inc.

Centi & Perathoner; Towards Solar Fuels from Water and CO2; ChemSusChem 2010, 3, 195-208, © 2010 Wiley-VCH Verlag GmbH& Co. KGaA, Weinheim.

David P. Summers, Steven Leach and Karl W. Frese Jr.; The Electrochemical Reduction of Aqueous Carbon Dioxide to Methanol at Molybdenum Electrodes With Low Overpotentials; J Electroanal. Chem., 205 (1986) 219-232, Elsevier Sequoia S.A., Lausanne—Printed in The Netherlands.

Isao Taniguchi, Benedict Aurian-Blajeni and John O'M. Bockris; Photo-Aided Reduction of Carbon Dioxide to Carbon Monoxide; J. Electroanal. Chem, 157 (1983) 179-182, Elsevier Sequoia S.A., Lausanne—Printed in The Netherlands.

Isao Taniguchi, Benedict Aurian-Blajeni and John O'M. Bockris; The Mediation of the Photoelectrochemical Reduction of Carbon Dioxide by Ammonium Ions; J. Electroanal. Chem, 161 (1984) 385-388, Elsevier Sequoia S.A., Lausanne—Printed in The Netherlands.

Hiroshi Yoneyama, Kenji Sugimura and Susumu Kuwabata; Effects of Electrolytes on the Photoelectrochemical Reduction of Carbon Dioxide at Illuminated p-Type Cadmium Telluride and p-Type Indium Phosphide Electrodes in Aqueous Solutions; J. Electroanal. Chem., 249 (1988) 143-153, Elsevier Sequoia ,S.A., Lausanne—Printed in The Netherlands.

Whipple, Finke, and Kenis; Microfluidic Reactor for the Electrochemical Reduction of Carbon Dioxide: The Effect of pH; Electrochemical and Solid-State Letters, 13 (9) B109-B111 (2010).

Ylb Vassiliev, V S Bagotzky, N V. Osetrov, O.A. Khazova and Na Mayorova; Electroreduction of Carbon Dioxide Part I. The Mechanism and Kinetics of Electroreduction. Chem. 189 (1985) 271-294, Elsevier Sequoia SA , Lausanne—Printed in The Netherlands.

Ylb Vassiliev, V S Bagotzky , N V. Osetrov, O.A. Khazova and Na Mayorova; Electroreduction of Carbon Dioxide Part II. The Mechanism of Reduction in Aprotic Solvents; J Electroanal. Chem. 189 (1985) 295-309, Elsevier Sequoia SA , Lausanne—Printed in The Netherlands.

Watanabe, Shibata, Kato, Azuma, and Sakata; Design of Alloy Electrocatalysts for C02 Reduction III. The Selective and Reversible Reduction of C02 on Cu Alloy Electrodes; J. Electrochem. Soc., vol. 138, No. 11, Nov. 1991 © The Electrochemical Society, Inc., pp. 3382-3389.

Soichiro Yamamura, Hiroyuki Kojima, Jun Iyoda and Wasaburo Kawai; Photocatalytic Reduction of Carbon Dioxide with Metal-Loaded SiC Powders; J. Eleciroanal. Chem., 247 (1988) 333-337, Elsevier Sequoia S.A., Lausanne—Printed in The Netherlands.

R. Piercy, N. A. Hampson; The electrochemistry of indium, Journal of Applied Electrochemistry 5 (1975) 1-15, Printed in Great Britain, © 1975 Chapman and Hall Ltd.

C. K. Watanabe, K. Nobe; Electrochemical behaviour of indium in H2S04, Journal of Applied Electrochemistry 6 (1976) 159-162, Printed in Great Britain, © 1976 Chapman and Hall Ltd.

Yumi Akahori, Nahoko Iwanaga, Yumi Kato, Osamu Hamamoto, and Mikita Ishii; New Electrochemical Process for CO2 Reduction to from Formic Acid from Combustion Flue Gases; Electrochemistry; vol. 72, No. 4 (2004), pp. 266- 270.

Hamamoto, Akahori, Goto, Kato, and Ishii; Modified Carbon Fiber Electrodes for Carbon Dioxide Reduction; Electrochemistry, vol. 72, No. 5 (2004), pp. 322-327.

S. Omanovicâ, M. Metikosï-Hukovic; Indium as a cathodic material: catalytic reduction of formaldehyde; Journal of Applied Electrochemistry 27 (1997) 35-41.

Hara, Kudo, and Sakata; Electrochemical reduction of carbon dioxide under high pressure on various electrodes in an aqueous electrolyte; Journal of Electroanalytical Chemistry 391 (1995) 141-147.

Stephen K. Ritter, What Can We Do With Carbon Dioxide? Scientists are trying to find ways to convert the plentiful greenhouse gas into fuels and other value-added products, Chemical & Engineering News, Apr. 30, 2007, vol. 85, No. 18, pp. 11-17, http://pubs.acs.org/cen/coverstory/85/8518cover.html.

Toshio Tanaka, Molecular Orbital Studies on the Two-Electron Reduction of Carbon Dioxide to Give Formate Anion, Memoirs of Fukui University of Technology, vol. 23, Part 1, 1993, pp. 223-230.

Columbia, Crabtree, and Thiel; The Temperature and Coverage Dependences of Adsorbed Formic Acid and Its Conversion to Formate on Pt(111), J. Am. Chem. SOC., vol. 114, No. 4, 1992, pp. 1231-1237.

Brian R. Eggins and Joanne McNeill, Voltammetry of Carbon Dioxide, Part I. A General Survey of Voltammetry At Different Electrode Materials in Different Solvents, J. Electroanal. Chem., 148 (1983) 17-24, Elsevier Sequoia S.A., Lausanne—Printed in The Netherlands.

Varghese, Paulose, Latempa, and Grimes; High-Rate Solar Photocatalytic Conversion of CO2 and Water Vapor to Hydrocarbon Fuels; Nano Letters, 2009, vol. 9, No. 2, pp. 731-737.

Han, Chu, Kim, Song, and Kim; Photoelectron spectroscopy and ab initio study of mixed cluster anions of [(CO21-3(Pyridine)1-6: Formation of a covalently bonded anion core of (C5H5N—CO2), Journal of Chemical Physics, vol. 113, No. 2, Jul. 8, 2000, pp. 596-601.

Heinze, Hempel, and Beckmann; Multielectron Storage and Photo-Induced Electron Transfer in Oligonuclear Complexes Containing Ruthenium(II) Terpyridine and Ferrocene Building Blocks, Eur. J. Inorg. Chem. 2006, 2040-2050.

Lin and Frei, Bimetallic redox sites for photochemical CO2 splitting in mesoporous silicate sieve, C. R. Chimie 9 (2006) 207-213.

Heyduk, MacIntosh, and Nocera; Four-Electron Photochemistry of Dirhodium Fluorophosphine Compounds, J. Am. Chem. Soc. 1999, 121, 5023-5032.

Witham, Huang, Tsung, Kuhn, Somorjai, and Toste; Converting homogeneous to heterogeneous in electrophilic catalysis using monodisperse metal nanoparticles, Nature Chemistry, DOI: 10.1038/NCHEM.468, pp. 1-6, 2009.

Hwang and Shaka, Water Suppression That Works. Excitation Sculpting Using Arbitrary Waveforms and Pulsed Field Gradients, Journal of Magnetic Resonance, Series A 112, 275-279 (1995).

Weissermel and Arpe, Industrial Organic Chemistry, 3rd Edition 1997, Published jointly by VCH Verlagsgesellschaft mbH, Weinheim (Federal Republic of Germany) VCH Pubiishers, Inc., New York, NY (USA), pp. 1-481.

T. Iwasita, . C. Nart, B. Lopez and W. Vielstich; on the Study of Adsorbed Species at Platinum From Methanol, Formic Acid and

(56) References Cited

OTHER PUBLICATIONS

Reduced Carbon Dioxide VIA in SITU FT-ir Spectroscopy, Electrochimica Atca, vol. 37. No. 12. pp. 2361-2367, 1992, Printed in Great Britain.

Lackner, Grimes, and Ziock; Capturing Carbon Dioxide From Air; pp. 1-15.

Kang, Kim, Lee, Hong, and Moon; Nickel-based tri-reforming catalyst for the production of synthesis gas, Applied Catalysis, A: General 332 (2007) 153-158.

Kostecki and Augustynski, Electrochemical Reduction of CO2 at an Activated Silver Electrode, Ber. Bunsenges. Phys. Chem. 98, 1510-1515 (1994) No. I2 C VCH Verlagsgesellschaft mbH, 0-69451 Weinheim, 1994.

Kunimatsu and Kita; Infrared Spectroscopic Study of Methanol and Formic Acid Adsorrates on a Platinum Electrode, Part II. Role of the Linear CO(a) Derived From Methanol and Formic Acid in the Electrocatalytic Oxidation of CH,OH and HCOOH, J Electroanal Chem., 218 (1987) 155-172, Elsevier Sequoia S A , Lausanne—Printed in The Netherlands.

Lichter and Roberts, 15N Nuclear Magnetic Resonance Spectroscopy. XIII. Pyridine-15N1, Journal of the American Chemical Society 1 93:20 1 Oct. 6, 1971, pp. 5218-5224.

R.J.L. Martin, The Mechanism of the Cannizzaro Reaction of Formaldehyde, May 28, 1954, pp. 335-347.

Fujitani, Nakamura, Uchijima, and Nakamura; The kinetics and mechanism of methanol synthesis by hydrogenation of C02 over a Zn-deposited Cu(111surface, Surface Science 383 (1997) 285-298.

Richard S. Nicholson and Irving Shain, Theory of Stationary Electrode Polarography, Single Scan and Cyclic Methods Applied to Reversible, Irreversible, and Kinetic Systems, Analytical Chemistry, vol. 36, No. 4, Apr. 1964, pp. 706-723.

Noda, Ikeda, Yamamoto, Einaga, and Ito; Kinetics of Electrochemical Reduction of Carbon Dioxide on a Gold Electrode in Phosphate Buffer Solutions; Bull. Chem. Soc. Jpn., 68, 1889-1895 (1995).

Joseph W. Ochterski, Thermochemistry in Gaussian, (c)2000, Gaussian, Inc., Jun. 2, 2000, 19 Pages.

Kotaro Ogura and Mitsugu Takagi, Electrocatalytic Reduction of Carbon Dioxide to Methanol, Part IV Assessment of the Current-Potential Curves Leading to Reduction, J. Electroanal. Chem., 206 (1986) 209-216, Elsevier Sequoia S.A., Lausanne—Printed in The Netherlands.

Ohkawa, Noguchi, Nakayama, Hashimoto, and Fujishima; Electrochemical reduction of carbon dioxide on hydrogen-storing materials, Part 3. The effect of the absorption of hydrogen on the palladium electrodes modified with copper; Journal of Electroanalytical Chemistry, 367 (1994) 165-173.

Ohmstead and Nicholson, Cyclic Voltammetry Theory for the Disproportionation Reaction and Spherical Diffusion, Analytical Chemistry, vol. 41, No. 6, May 1969, pp. 862-864.

Shunichi Fukuzumi, Bioinspired Energy Conversion Systems for Hydrogen Production and Storage, Eur. J. Inorg. Chem. 2008, 1339-1345.

Angamuthu, Byers, Lutz, Spek, and Bouwman; Electrocatalytic CO2 Conversion to Oxalate by a Copper Complex, Science, vol. 327, Jan. 15, 2010, pp. 313-315.

J- Fischer, Th. Lehmann, and E. Heitz; The production of oxalic acid from C02 and H2O, Journal of Applied Electrochemistry 11 (1981) 743-750.

Rosenthal, Bachman, Dempsey, Esswein, Gray, Hodgkiss, Manke, Luckett, Pistorio, Veige, and Nocera; Oxygen and hydrogen photocatalysis by two-electron mixed-valence coordination compounds, Coordination Chemistry Reviews 249 (2005) 1316-1326.

Rudolph, Dautz, and Jager; Macrocyclic [N42-] Coordinated Nickel Complexes as Catalysts for the Formation of Oxalate by Electrochemical Reduction of Carbon Dioxide, J. Am. Chem. Soc. 2000, 122, 10821-10830.

D.A. Shirley, High-Resolution X-Ray Photoemission Spectrum of the Valence Bands of Gold, Physical Review B, vol. 5, No. 12, Jun. 15, 1972, pp. 4709-4714.

S.G. Sun and J. Clavilier, The Mechanism of Electrocatalytic Oxidation of Formic Acid on Pt (100) and Pt (111) in Sulphuric Acid Solution: An Emirs Study, J. Electroanal. Chem., 240 (1988) 147-159, Elsevier Sequoia S.A., Lausanne—Printed in The Netherlands.

Sun, Lin, Li, and Mu; Kinetics of dissociative adsorption of formic acid on Pt(100), Pt(610), Pt(210), and Pt(110) single-crystal electrodes in perchloric acid solutions, Journal of Electroanalytical Chemistry, 370 (1994) 273-280.

Marek Szklarczyk, Jerzy Sobkowski and Jolanta Pacocha, Adsorption and Reduction of Formic Acid on p-Type Silicon Electrodes, J. Electroanal. Chem., 215 (1986) 307-316, Elsevier Sequoia S.A., Lausanne—Printed in The Netherlands.

Zhao, Fan, and Wang, Photo-catalytic CO2 reduction using sol-gel derived titania-supported zinc-phthalocyanine, Journal of Cleaner Production 15 (2007) 1894-1897.

Tanaka and Ooyama, Multi-electron reduction of CO2 via Ru-CO2, -C(O)OH, -CO, -CHO, and -CH2OH species, Coordination Chemistry Reviews 226 (2002) 211-218.

Toyohara, Nagao, Mizukawa, and Tanaka, Ruthenium Formyl Complexes as the Branch Point in Two- and Multi-Electron Reductions of CO2, Inorg. Chem. 1995, 34, 5399-5400.

Watanabe, Shibata, and Kato; Design of Ally Electrocatalysts for CO2 Reduction, III. The Selective and Reversible Reduction of CO2 on Cu Alloy Electrodes; J. Electrochem. Soc., vol. 138, No. 11, Nov. 1991, pp. 3382-3389.

Dr. Chao Lin, Electrode Surface Modification and its Application to Electrocatalysis, V. Catalytic Reduction of Carbon Dioxide to Methanol, Thesis, 1992, Princeton University, pp. 157-179.

Dr. Gayatri Seshadri, Part I. Electrocatalysis at modified semiconductor and metal electrodes; Part II. Electrochemistry of nickel and cadmium hexacyanoferrates, Chapter 2—The Electrocatalytic Reduction of CO2 to Methanol at Low Overpotentials, 1994, Princeton University, pp. 52-85.

Shibata et al., "Simultaneous Reduction of Carbon Dioxide and Nitrate Ions at Gas-Diffusion Electrodes with Various Metallophthalocyanine Catalysts", Electrochima Acta (no month, 2003), vol. 48, pp. 3953-3958.

Shibata et al., "Electrochemical Synthesis of Urea at Gas-Diffusion Electrodes", J. Electrochem. Soc. (Jul. 1998), vol. 145, No. 7, pp. 2348-2353.

Non-Final Office Action for U.S. Appl. No. 12/875,227, dated Dec. 11, 2012.

Green et al., "Vapor-Liquid Equilibria of Formaldehyde-Methanol-Water", Industrial and Engineering Chemistry (Jan. 1955), vol. 47, No. 1, pp. 103-109.

Shibata et al., "Electrochemical Synthesis of Urea at Gas-Diffusion Electrodes Part VI. Simultaneous Reduction of Carbon Dioxide and Nitrite Ions with Various Metallophthalocyanine Catalysts". J. of Electroanalytical Chemistry (no month, 2001), vol. 507, pp. 177-184.

Jaaskelainen and Haukka, The Use of Carbon Dioxide in Ruthenium Carbonyl Catalyzed 1-hexene Hydroformylation Promoted by Alkali Metal and Alkaline Earth Salts, Applied Catalysis A: General, 247, 95-100 (2003).

Heldebrant et al., "Reversible Zwitterionic Liquids, The Reaction of Alkanol Guanidines, Alkanol Amidines, and Diamines wih CO2", Green Chem. {mo month, 2010), vol. 12, pp. 713-721.

Seshardi G., Lin C., Bocarsly A.B., A new homogeneous electrocatalyst for the reduction of carbon dioxide to methanol at low overpotential, Journal of Electroanalytical Chemistry, 1994, 372, pp. 145-150.

Seshadri et al, A New Homogeneous Electrocatalyst for the Reduction of Carbon Dioxide to Methanol at Low Overpotential, Journal of Electroanalytical Chemistry, 372 (1994), 145-50.

Green et al., Vapor-Liquid Equilibria of Formaldehyde-Methanol-Water, Industrial and Engineering Chemistry (Jan. 1955), vol. 47, No. 1, pp. 103-109.

Scibioh et al, Electrochemical Reduction of Carbon Dioxide: A Status Report, Proc Indian Natn Sci Acad (May 2004), vol. 70, A, No. 3, pp. 407-462.

Gennaro et al., Homogeneous Electron Transfer Catalysis of the Electrochemical Reduction of Carbon Dioxide. Do Aromatic Anion Radicals React in an Outer-Sphere Manner?, J. Am. Chem. Soc. (no month, 1996), vol. 118, pp. 7190-7196.

(56) References Cited

OTHER PUBLICATIONS

Perez et al., Activation of Carbon Dioxide by Bicyclic Amidines, J. Org. Chem. (no month, 2004), vol. 69, pp. 8005-8011.

Zaragoza Dorwald, Side Reactions in Organic Synthesis, 2005, Wiley-VCH Verlag GmbH & Co. KGaA, Weinheim, Preface. Pg. IX.

Liansheng et al, Journal of South Central University Technology, Electrode Selection of Electrolysis with Membrane for Sodium Tungstate Solution, 1999, 6(2), pp. 107-110.

Mahmood et al., Use of Gas-Diffusion Electrodes for High-Rate Electrochemical Reduction of Carbon Dioxide. II. Reduction at Metal Phthalocyanine-lmpregnated Electrodes, J. of Appl. Electrochem. (no month, 1987), vol. 17, pp. 1223-1227.

Tanno et al., Electrolysis of Iodine Solution in a New Sodium Bicarbonate-Iodine Hybrid Cycle, International Journal of Hydrogen Energy (no month, 1984), vol. 9, No. 10, pp. 841-848.

Seshadri et al, "A new homogeneous catalyst for the reduction of carbon dioxide to methanol at low overpotential," Journal of Electroanalytical Chemistry, 372 (1994) 145-150.

Scibioh et al, "Electrochemical Reductin of Carbon Dioxide: A Status Report," Proc. Indian Natn Science Acad., 70, A, No. 3, May 2004, pp. 407-762.

Fukaya et al., "Electrochemical Reduction of Carbon Dioxide to Formate Catalyzed by Rh(bpy)3CI3", Kagaku Gijutsu Kenkyusho Hokoku (no month, 1986), vol. 81, No. 5, pp. 255-258. 1-page abstract only.

Li et al., "The Electro-Reduction of Carbon Dioxide in a Continuous Reactor", J. of Applied Electrochemistry {no month, 2005), vol. 35, pp. 955-965.

Kaneco et al., "Electrochemical Reduction of Carbon Dioxide to Ethylene with High Faradaic Efficiency at a Cu Electrode in CsOH/Methanol", Electrochimica Acta (no month, 1999), vol. 44, pp. 4701-4706.

Kaneco et al., "Electrochemical Conversion of Carbon Dioxide to Formic Acid on Pb in KOH/Methanol Electrolyte at Ambient Temperature and Pressure", Energy {no month, 1998), vol. 23, No. 12, pp. 1107-1112.

Yuan et al., "Electrochemical Activation of Carbon Dioxide for Synthesis of Dimethyl Carbonate in an Ionic Liquid", Electrochimica Acta (no month, 2009), vol. 54, pp. 2912-2915.

U.S. Appl. No. 13/724,647, filed Dec. 21, 2012; Office Action mailed Oct. 17, 2013 (LL 0024).

U.S. Appl. No. 13/787,481, filed Mar. 6, 2013; Office Action mailed Sep. 13, 2013 {LL 0016B).

U.S. Appl. No. 13/724,082, filed Dec. 21, 2012; Office Action mailed Aug. 12, 2013 (0029).

U.S. Appl. No. 13/724,522, filed Dec. 21, 2012; Office Action mailed Oct. 1, 2013 (0021).

U.S. Appl. No. 13/724,885, filed Dec. 21, 2012; Office Action mailed Aug. 21, 2013 (0017A).

U.S. Appl. No. 13/724,231, filed Dec. 21, 2012; Office Action mailed Aug. 20, 2013 (0025).

Seshadri et al., "A new homogeneous electrocatalyst for the reduction of carbon dioxide to methanol at low overpotential", Journal of Electroanalytical Chemistry and Interfacial Electro Chemistry, Elsevier, Amsterdam, NL, vol. 372, No. 1-2, Jul. 8, 1994, pp. 145-150.

Hossain et al., "Palladium and cobalt complexes of substituted quinoline, bipyridine and phenanthroline as catalysts for electrochemical reduction of carbon dioxide", Electrochimica Acta, Elsevier Science Publishers, vol. 42, No. 16, Jan. 1, 1997, pp. 2577-2585.

Fisher et al., "Electrocatalytic reduction of carbon dioxide by using macrocycles of nickel and cobalt", Journal of the American Chemical Society, vol. 102, No. 24, Sep. 1, 1980, pp. 7361-7363.

Ishida et al., Selective Formation of HC00—In the Electrochemical CO2 Reduction Catalyzed by URU(BPY)2(CO)2 3/4 2+(BPY = 2,2 'T-Bipyridine), Journal of the Chemical Society, Chemical Communications, Chemical Society, Letchworth, GB, Jan. 1, 1987, pp. 131-132.

Zhao et al., "Electrochemical reduction of supercritical carbon dioxide in ionic liquid 1-n-butyl-3-methylimidazolium hexafluorophosphate", Journal of Supercritical Fluids, PRA Press, US, vol. 32, No. 1-3, Dec. 1, 2004, pp. 287-291.

Hori et al, chapter on "Electrochemical CO2 Reduction on Metal Electrodes," in the book "Modern Aspects of Electrochemistry," vol. 42, pp. 106 and 107.

Czerwinski et al, "Adsorption Study of CO2 on Reticulated vitreous carbon (RVC) covered with platinum," Analytical Letters, vol. 18, Issue 14 (1985), pp. 1717-1722.

Hammouche et al, Chemical Catalysis of Electrochemical Reactions. Homogeneous Catalysis of the Electrochemical Reduction of Carbon Dioxide by Iron ("0") Porphyrins. Role of the Addition of Magnesium Cations. J. Am. Chem. Soc. 1991, 113, 8455-8466.

Hossain et al., Palladium and Cobalt Complexes of Substituted Quinoline, Bipyridine and Phenanthroline as Catalysts for Electrochemical Reduction of Carbon Dioxide, Electrochimica Acta (no month, 1997), vol. 42, No. 16, pp. 2577-2785.

Scibioh et al., "Electrochemical Reduction of Carbon Dioxide: A Status Report", Proc Indian Natn Sci Acad (May 2004), vol. 70, A, No. 3, pp. 407-462.

* cited by examiner

US 8,658,016 B2

CARBON DIOXIDE CAPTURE AND CONVERSION TO ORGANIC PRODUCTS

CROSS-REFERENCE TO RELATED APPLICATIONS

Noon The present application claims the benefit under 35 U.S.C. §119(e) of U.S. Patent Application Ser. No. 61/504,828, filed Jul. 6, 2011.

The above-listed application is hereby incorporated by reference in its entirety.

FIELD

The present disclosure generally relates to the field of electrochemical reactions, and more particularly to methods and/or systems for capturing carbon dioxide and for electrochemical conversion of the captured carbon dioxide to organic products.

BACKGROUND

The combustion of fossil fuels in activities such as electricity generation, transportation, and manufacturing produces billions of tons of carbon dioxide annually. Research since the 1970s indicates increasing concentrations of carbon dioxide in the atmosphere may be responsible for altering the Earth's climate, changing the pH of the ocean and other potentially damaging effects. Countries around the world, including the United States, are seeking ways to mitigate emissions of carbon dioxide.

A mechanism for mitigating emissions is to convert carbon dioxide into economically valuable materials such as fuels and industrial chemicals. If the carbon dioxide is converted using energy from renewable sources, both mitigation of carbon dioxide emissions and conversion of renewable energy into a chemical form that can be stored for later use may be possible.

SUMMARY OF THE PREFERRED EMBODIMENTS

The present invention is directed to using particular capture agents, solvents, and/or electrolytes to capture/bind carbon dioxide and to reduce the captured carbon dioxide to organic products. The present invention includes the process, system, and various components thereof.

It is to be understood that both the foregoing general description and the following detailed description are exemplary and explanatory only and are not necessarily restrictive of the disclosure as claimed. The accompanying drawings, which are incorporated in and constitute a part of the specification, illustrate an embodiment of the disclosure and together with the general description, serve to explain the principles of the disclosure.

BRIEF DESCRIPTION OF THE DRAWINGS

The numerous advantages of the present disclosure may be better understood by those skilled in the art by reference to the accompanying figures in which.

DETAILED DESCRIPTION OF THE PREFERRED EMBODIMENTS

Reference will now be made in detail to the presently preferred embodiments of the present disclosure, examples of which are illustrated in the accompanying drawings.

In accordance with preferred embodiments of the present disclosure, an electrochemical system is provided that captures carbon dioxide and that converts the captured carbon dioxide to organic products. Use of a carbon dioxide capture agent facilitates the capture process. The capture of carbon dioxide may refer herein to the binding of carbon dioxide by reaction of carbon dioxide with a chemical to form an intermediate. It may also refer to the interaction between carbon dioxide and a chemical to form an adduct. It may further refer to the interaction between carbon dioxide and solvents into which the carbon dioxide is bubbled, where the solvents may absorb carbon dioxide and have enhanced solubility for carbon dioxide than does an aqueous solution.

Before any embodiments of the invention are explained in detail, it is to be understood that the embodiments described below do not limit the scope of the claims that follow. Also, it is to be understood that the phraseology and terminology used herein is for the purpose of description and should not be regarded as limiting. The use of terms such as "including," "comprising," or "having" and variations thereof herein are generally meant to encompass the item listed thereafter and equivalents thereof as well as additional items. Further, unless otherwise noted, technical terms may be used according to conventional usage.

In certain preferred embodiments, the capture of carbon dioxide and the reduction of the captured carbon dioxide to produce organic products may be preferably achieved in a divided electrochemical or photoelectrochemical cell having at least two compartments. One compartment contains an anode suitable for oxidation, and another compartment contains a working cathode electrode and a carbon dioxide capture agent. The compartments may be separated by a porous glass frit, microporous separator, ion exchange membrane, or other ion conducting bridge. Both compartments generally contain an aqueous or non-aqueous solution of an electrolyte. Carbon dioxide gas may be continuously bubbled through the cathodic electrolyte solution to preferably saturate the solution or the solution may be pre-saturated with carbon dioxide. Mixing of carbon dioxide with the electrolyte solution and/or a carbon dioxide capture agent may occur within the cathode chamber or in a mixing chamber external to the cathode chamber.

Figure 1A:
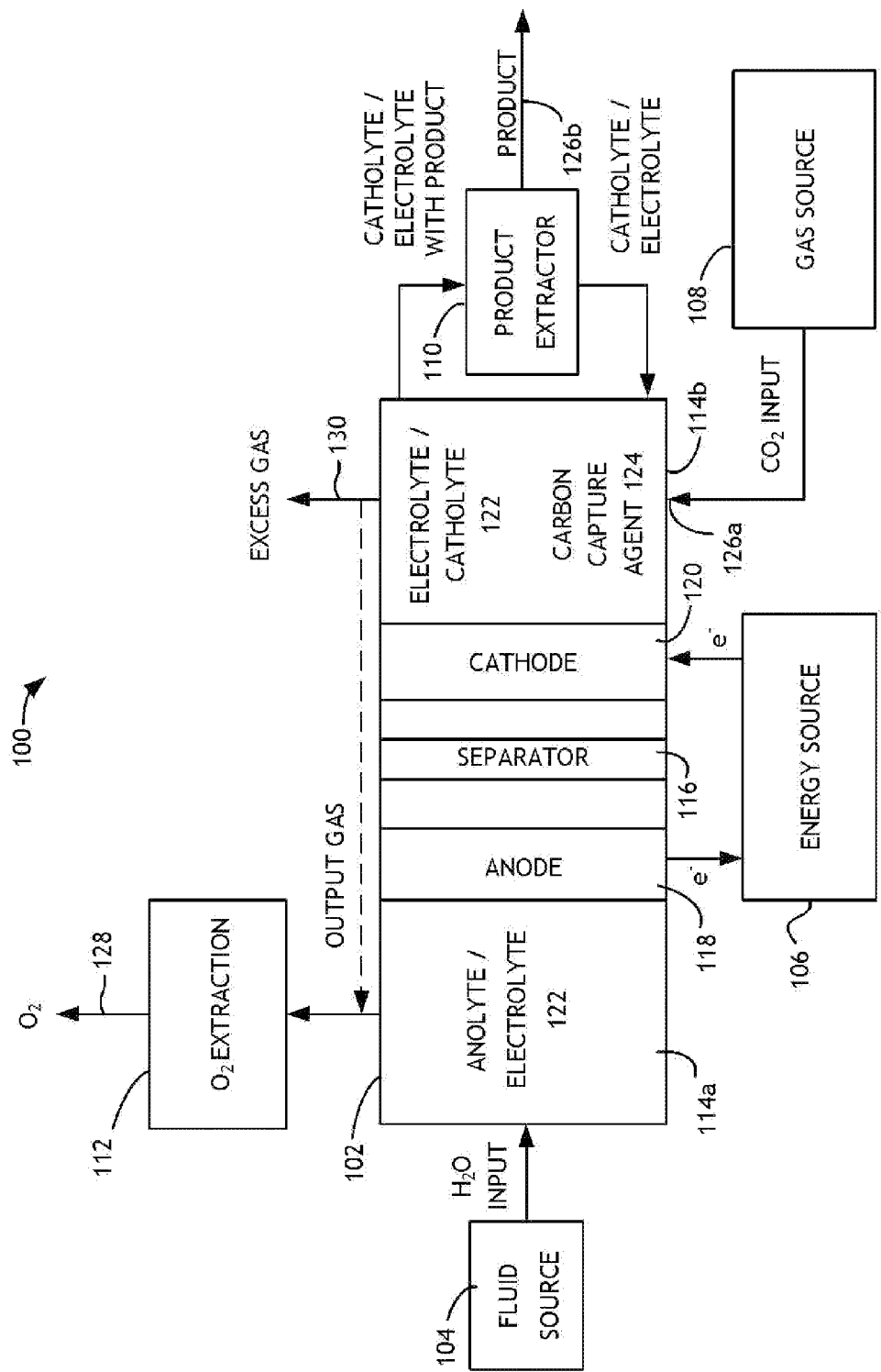
FIG. 1A is a block diagram of a preferred system in accordance with an embodiment of the present disclosure.

Referring to FIG. 1A, a block diagram of a system 100 is shown in accordance with an embodiment of the present invention. System 100 may be utilized for capture of carbon dioxide and conversion of the captured carbon dioxide to organic products. The system (or apparatus) 100 generally comprises a cell (or container) 102, a fluid source 104 (to supply solvent to the cell 102), an energy source 106, a gas source 108, a product extractor 110 and an oxygen extractor 112. A product or product mixture may be output from the product extractor 110 after extraction. An output gas containing oxygen may be output from the oxygen extractor 112 after extraction.

Figure 1B:
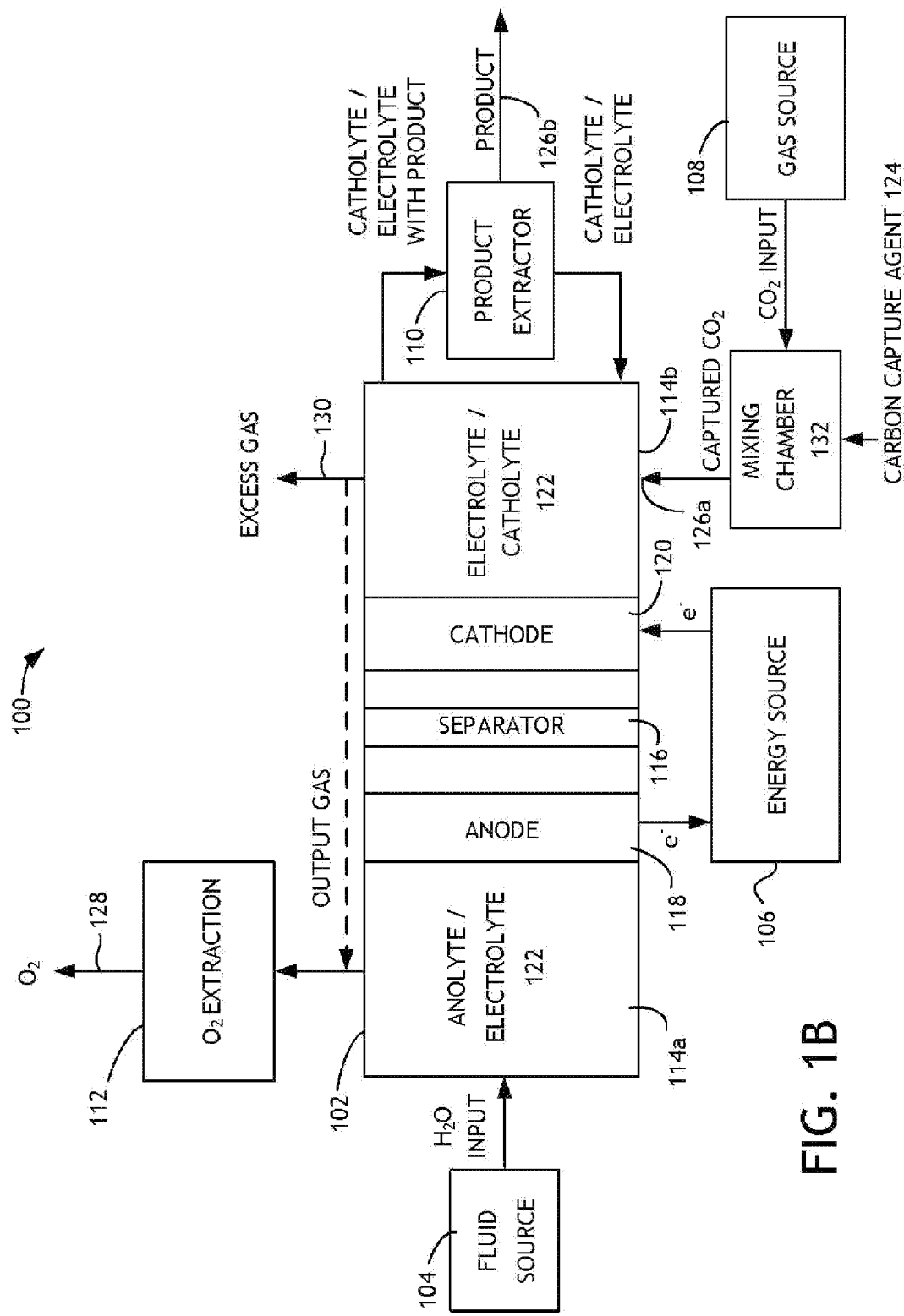
FIG. 1B is a block diagram of a preferred system in accordance with another embodiment of the present disclosure.

The cell 102 may be implemented as a divided cell. The divided cell may be a divided electrochemical cell and/or a divided photochemical cell. The cell 102 is generally operational to capture carbon dioxide ($CO_2$) and to reduce carbon dioxide into products or product intermediates. In particular implementations, the cell 102 is operational to capture carbon dioxide by binding carbon dioxide to a structure and/or molecule and/or by increasing the solubility of carbon dioxide in the solvent. The reduction generally takes place by introducing (e.g., bubbling) carbon dioxide into an electrolyte solution in the cell 102. A carbon dioxide capture agent in the cell may capture at least a portion of the introduced carbon dioxide. In another implementation (as shown in FIG. 1B), the carbon dioxide capture agent and the carbon dioxide interact external to the cathode chamber to permit capture of carbon dioxide prior to introduction to the cathode chamber. A cathode 120 in the cell 102 may reduce the captured carbon dioxide into a product mixture, where the product mixture preferably includes organic products.

The cell 102 generally comprises two or more compartments (or chambers) 114a-114b, a separator (or membrane) 116, an anode 118, and a cathode 120. The anode 118 may be disposed in a given compartment (e.g., 114a). The cathode 120 may be disposed in another compartment (e.g., 114b) on an opposite side of the separator 116 as the anode 118. In particular implementations, the cathode 120 includes materials suitable for the reduction of carbon dioxide including cadmium, a cadmium alloy, cobalt, a cobalt alloy, nickel, a nickel alloy, chromium, a chromium alloy, indium, an indium alloy, iron, an iron alloy, copper, a copper alloy, lead, a lead alloy, palladium, a palladium alloy, platinum, a platinum alloy, molybdenum, a molybdenum alloy, tungsten, a tungsten alloy, niobium, a niobium alloy, silver, a silver alloy, tin, a tin alloy, rhodium, a rhodium alloy, ruthenium, a ruthenium alloy, carbon, and mixtures thereof. An electrolyte solution 122 (e.g., anolyte or catholyte 122) may fill both compartments 114a-114b. The electrolyte solution 122 may include water as a solvent with water soluble salts for providing various cations and anions in solution, however an organic solvent may also be utilized. A carbon dioxide capture agent 124 is preferably added to the compartment 114b, in certain implementations is also added to the compartment 114a, and in other implementations is added to a mixing chamber 132 (as shown in FIG. 1B) external to the compartment 114b. For instance, the carbon dioxide capture agent 124 may be utilized as the solvent and/or electrolyte for the compartments 114a and 114b of the cell 102.

In a particular implementation, the carbon dioxide capture agent 124 includes at least one of guanidine or a guanidine derivative. Carbon dioxide capture agent 124 may include 1,1,3,3 tetramethylguanidine, 1,5,7-triazabicyclo[4.4.0]dec-5-ene, 7-methyl-1,5,7-triazabicyclo[4.4.0]dec-5-ene, 1,8-diazabicyclo[5.4.0]undec-7-ene, 1,5-diazabicyclo[4.3.0]non-5-ene, and 1,4,5,6-tetrahydropyrimidine. In this implementation, the cell 102 preferably includes an aqueous solvent, a solvent including acetonitrile, dimethylfuran, or another organic solvent, or a mixture of water and an organic solvent (comprising between about 1% and 100% water by volume). The carbon dioxide capture agent 124 may facilitate capture of carbon dioxide in the compartment 114b (or in the mixing chamber 132) by forming a carbamic zwitterion with the carbon dioxide. Upon application of an electric potential between the anode 118 and the cathode 120, the carbamic zwitterion is reduced at the cathode 120, generating an organic product and regenerating the carbon dioxide capture agent. The organic product may include one or more of acetaldehyde, acetate, acetic acid, acetone, 1-butanol, 2-butanol, 2-butanone, carbon, carbon dioxide, carbon monoxide, carbonates, ethane, ethanol, ethylene, formaldehyde, formate, formic acid, glycolate, glycolic acid, glyoxal, glyoxylic acid, graphite, isopropanol, lactate, lactic acid, methane, methanol, oxalate, oxalic acid, propanal, 1-propanol, and polymers containing carbon dioxide.

In another particular implementation, the carbon dioxide capture agent is an ionic liquid that includes at least one of a guanidinium-based cation or a pyrimidium-based cation and preferably includes a halide anion, a sulfate anion, a phosphate anion, a nitrate anion, or another anion. The ionic liquid may act as a carbon dioxide capture 124 agent, a solvent, and an electrolyte. The ionic liquid may facilitate capture of the carbon dioxide (in the compartment 114b or in the mixing chamber 132) by increasing the solubility of the carbon dioxide as compared to an aqueous solvent. Upon application of an electric potential between the anode 118 and the cathode 120, the captured carbon dioxide is reduced at the cathode 120, generating an organic product. The organic product may include one or more of acetaldehyde, acetate, acetic acid, acetone, 1-butanol, 2-butanol, 2-butanone, carbon, carbon monoxide, carbonates, ethane, ethanol, ethylene, formaldehyde, formate, formic acid, glycolate, glycolic acid, glyoxal, glyoxylic acid, graphite, isopropanol, lactate, lactic acid, methane, methanol, oxalate, oxalic acid, propanal, 1-propanol, and polymers containing carbon dioxide.

In another implementation, the carbon dioxide capture agent 124 includes a non-aqueous, organic solvent. The organic solvent preferably includes one or more of methanol, acetonitrile, and dimethylfuran, and may include other organic solvents, provided that the organic solvent aids in the capture of carbon dioxide, such by including a higher solubility limit for carbon dioxide as compared to an aqueous solvent. The capture of the carbon dioxide may occur in one or more of the compartment 114b and the mixing chamber 132. In this implementation, the cell 102 may include an electrolyte suitable for a non-aqueous solvent, preferably with a quarternary ammonium cation. The electrolyte may include a halide-based anion. The compartment 114b preferably includes a pyridine-based catalyst to facilitate reduction of carbon dioxide at the cathode 120. Upon application of an electric potential between the anode 118 and the cathode 120, the captured carbon dioxide is reduced at the cathode 120, generating an organic product. The organic product may include one or more of carbon monoxide, carbonate, and oxalate.

The pH of the compartment 114b is preferably between about 1 and 9. A pH range of between about 1 to about 4 is preferable for production of carboxylic acids from carbon dioxide. A pH range of between about 4 to about 9 is preferable for production of other organic products (e.g., carbonates, carboxylates, aldehydes, ketones, alcohols, alkanes, and alkenes) from carbon dioxide. Other pH values may be utilized, such as when the carbon dioxide capture agent 124 includes an ionic liquid or an organic solvent.

The fluid source 104 preferably includes a water source, such that the fluid source 104 may provide pure water to the cell 102. The fluid source 104 may provide other fluids to the cell 102, including an organic solvent, such as methanol, acetonitrile, and dimethylfuran. The fluid source 104 may also provide a mixture of an organic solvent and water to the cell 102. In the implementations where the carbon dioxide capture agent 124 is an ionic liquid, the fluid source 104 may provide the ionic liquid to the cell 102.

The energy source 106 may include a variable electrical power source. The energy source 106 may be operational to generate an electrical potential between the anode 118 and the cathode 120. The electrical potential may be a DC voltage. In preferred embodiments, the applied electrical potential is generally between about −0.5V vs. SCE and about −3V vs. SCE at the cathode, and preferably from about −0.6V vs. SCE to about −2.5V vs. SCE at the cathode.

The gas source 108 preferably includes a carbon dioxide source. In some embodiments, carbon dioxide is bubbled directly into the compartment 114b containing the cathode 120. For instance, the compartment 114b may include a carbon dioxide input, such as a port 126a configured to be coupled between the carbon dioxide source and the cathode 120. In other preferred embodiments, the carbon dioxide from the gas source 108 is introduced to the mixing chamber 132, as shown in FIG. 1B. The carbon capture agent 124 may also be introduced to the mixing chamber 132. The mixing chamber 132 generally facilitates the interaction between the carbon dioxide and the carbon capture agent 124 to permit the capture of carbon dioxide within the mixing chamber 132. In a particular implementation, the mixing chamber 132 includes a stripping column to facilitate interaction between the carbon dioxide and the carbon capture agent 124. The captured carbon dioxide may be introduced to the cathode compartment 114b for reduction of the captured carbon dioxide at the cathode 120 to produce a product mixture and to regenerate the carbon capture agent 124.

Advantageously, the carbon dioxide may be obtained from any source (e.g., an exhaust stream from fossil-fuel burning power or industrial plants, from geothermal or natural gas wells or the atmosphere itself). Most suitably, the carbon dioxide may be obtained from concentrated point sources of generation prior to being released into the atmosphere. For example, high concentration carbon dioxide sources may frequently accompany natural gas in amounts of 5% to 50%, exist in flue gases of fossil fuel (e.g., coal, natural gas, oil, etc.) burning power plants, and high purity carbon dioxide may be exhausted from cement factories, from fermenters used for industrial fermentation of ethanol, and from the manufacture of fertilizers and refined oil products. Certain geothermal steams may also contain significant amounts of carbon dioxide. The carbon dioxide emissions from varied industries, including geothermal wells, may be captured on-site. Thus, the capture and use of existing atmospheric carbon dioxide in accordance with some embodiments of the present invention generally allow the carbon dioxide to be a renewable and essentially unlimited source of carbon.

The product extractor 110 may include an organic product and/or inorganic product extractor. The product extractor 110 generally facilitates extraction of one or more products from the electrolyte 122 and/or the carbon dioxide capture agent 124. The extraction may occur via one or more of a solid sorbent, carbon dioxide-assisted solid sorbent, liquid-liquid extraction, nanofiltration, and electrodialysis. The extracted products may be presented through a port 126b of the system 100 for subsequent storage, consumption, and/or processing by other devices and/or processes. In particular implementations, the product is continuously removed from the cell 102, where cell 102 operates on a continuous basis, such as through a continuous flow-single pass reactor where fresh catholyte and carbon dioxide is fed continuously as the input, and where the output from the reactor is continuously removed. The carbon dioxide capture agent 124 may be recycled back into the compartment 114b for capture of additional carbon dioxide.

The oxygen extractor 112 of FIG. 1 is generally operational to extract oxygen (e.g., $O_2$) byproducts created by the reduction of the carbon dioxide and/or the oxidation of water. In preferred embodiments, the oxygen extractor 112 is a disengager/flash tank. The extracted oxygen may be presented through a port 128 of the system 100 for subsequent storage and/or consumption by other devices and/or processes. Chlorine and/or oxidatively evolved chemicals may also be byproducts in some configurations, such as in an embodiment of processes other than oxygen evolution occurring at the anode 118. Such processes may include chlorine evolution, oxidation of organics to other saleable products, waste water cleanup, and corrosion of a sacrificial anode. Any other excess gases (e.g., is hydrogen) created by the reduction of the carbon dioxide may be vented from the cell 102 via a port 130.

Figure 2:
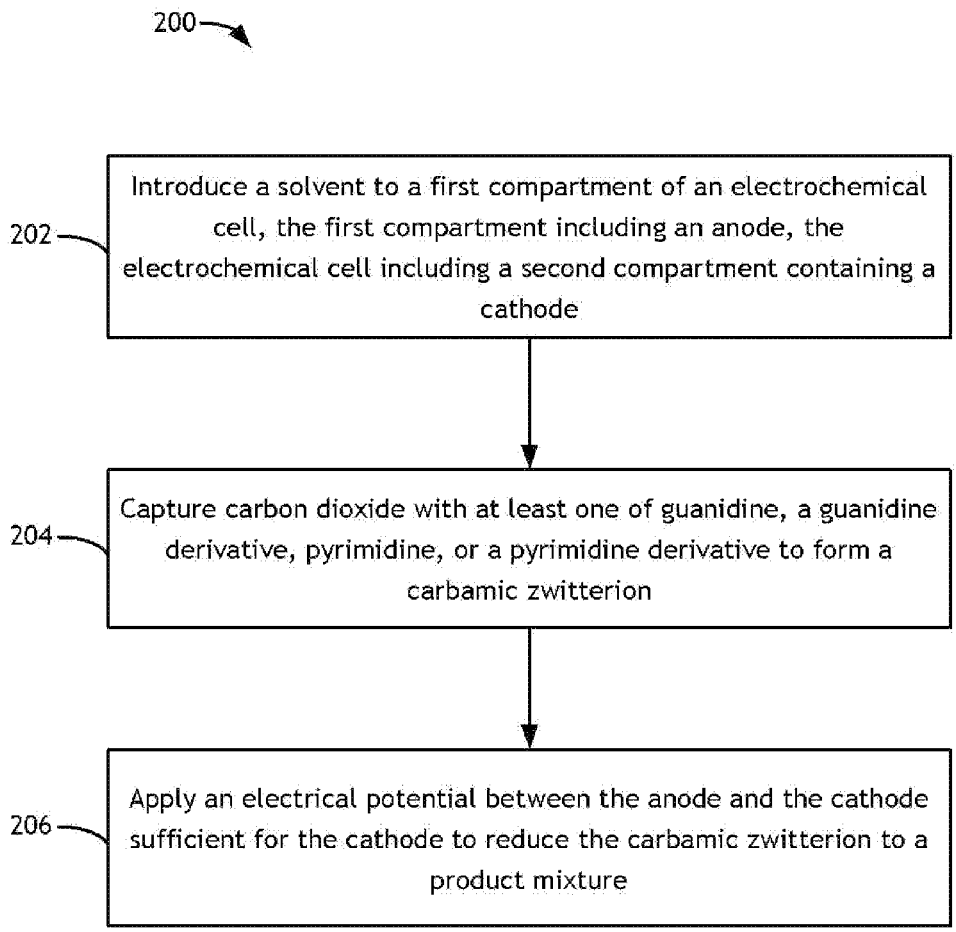
FIG. 2 is a flow diagram of a preferred method of capture of carbon dioxide and electrochemical conversion of the carbon dioxide.

Referring to FIG. 2, a flow diagram of a preferred method 200 for capture of carbon dioxide and electrochemical conversion of the carbon dioxide is shown. The method (or process) 200 generally comprises a step (or block) 202, a step (or block) 204, and a step (or block) 206. The method 200 may be implemented using the system 100.

In the step 202, a solvent may be introduced to a first compartment of an electrochemical cell. The first compartment may include an anode.

The electrochemical cell may also include a second compartment containing a cathode. Capturing carbon dioxide with at least one of guanidine, a guanidine derivative, pyrimidine, or a pyrimidine derivative may be performed in the step 204. In the step 206, an electrical potential may be applied between the anode and the cathode sufficient for the cathode to reduce the carbamic zwitterion to a product mixture. The product mixture may include one or more of acetaldehyde, acetate, acetic acid, acetone, 1-butanol, 2-butanol, 2-butanone, carbon, carbon monoxide, carbonates, ethane, ethanol, ethylene, formaldehyde, formate, formic acid, glycolate, glycolic acid, glyoxal, glyoxylic acid, graphite, isopropanol, lactate, lactic acid, methane, methanol, oxalate, oxalic acid, propanal, 1-propanol, and polymers containing carbon dioxide.

Figure 3:
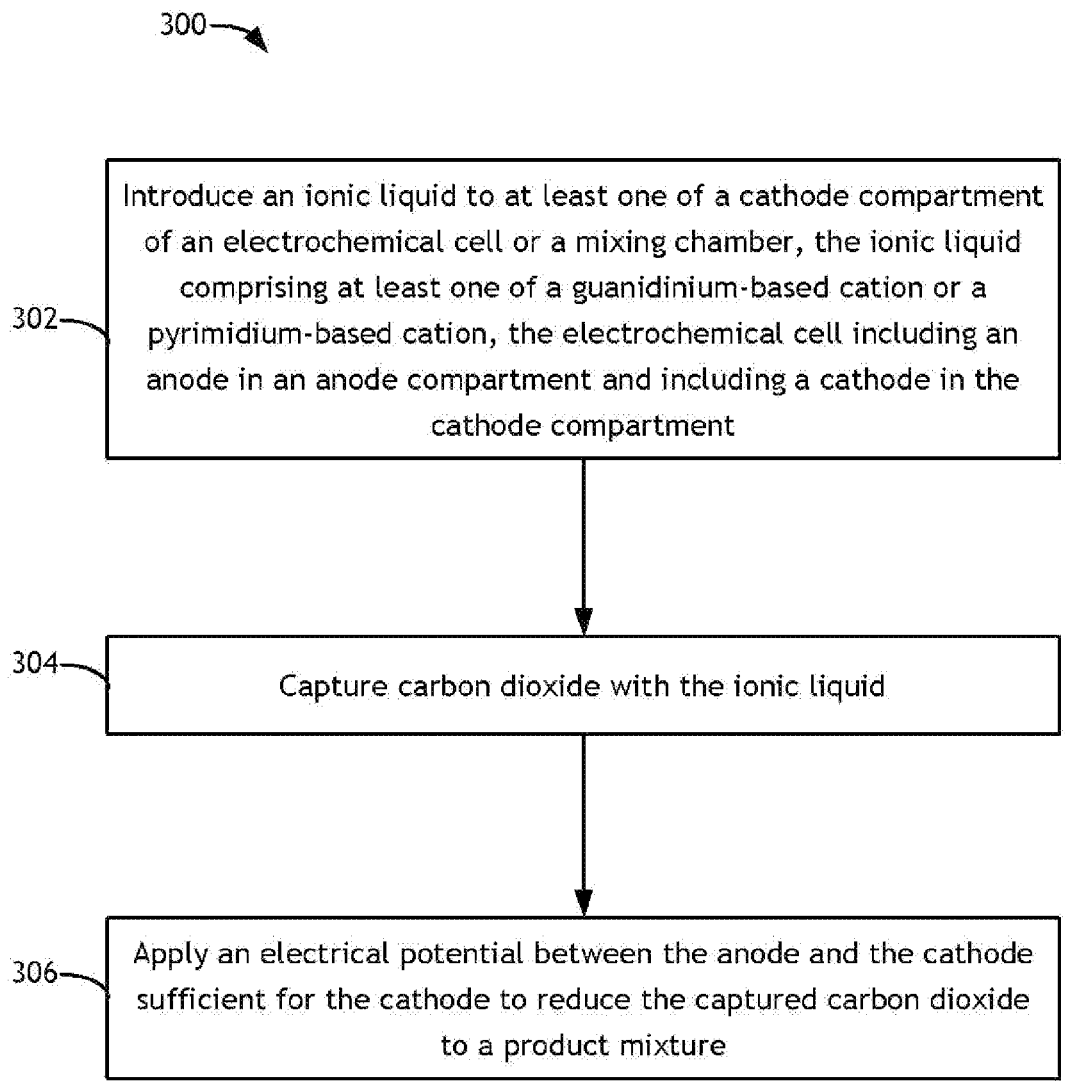
FIG. 3 is a flow diagram of another preferred method of capture of carbon dioxide and electrochemical conversion of the carbon dioxide.

Referring to FIG. 3, a flow diagram of another preferred method 300 for capture of carbon dioxide and electrochemical conversion of the carbon dioxide is shown. The method (or process) 300 generally comprises a step (or block) 302, a step (or block) 304, and a step (or block) 306. The method 300 may be implemented using the system 100.

In the step 302, an ionic liquid may be introduced to at least one of a cathode compartment of an electrochemical cell or a mixing chamber. The ionic liquid may comprise at least one of a guanidinium-based cation or a pyrimidium-based cation. The electrochemical cell may include an anode in an anode compartment and may include a cathode in the cathode compartment. Capturing carbon dioxide with the ionic liquid may be performed in the step 304. The second compartment may include a cathode. In the step 306, an electrical potential may be applied between the anode and the cathode sufficient for the cathode to reduce the captured carbon dioxide to a product mixture. The product mixture may include one or more of acetaldehyde, acetate, acetic acid, acetone, 1-butanol, 2-butanol, 2-butanone, carbon, carbon monoxide, carbonates, ethane, ethanol, ethylene, formaldehyde, formate, formic acid, glycolate, glycolic acid, glyoxal, glyoxylic acid, graphite, isopropanol, lactate, lactic acid, methane, methanol, oxalate, oxalic acid, propanal, 1-propanol, and polymers containing carbon dioxide.

Figure 4:
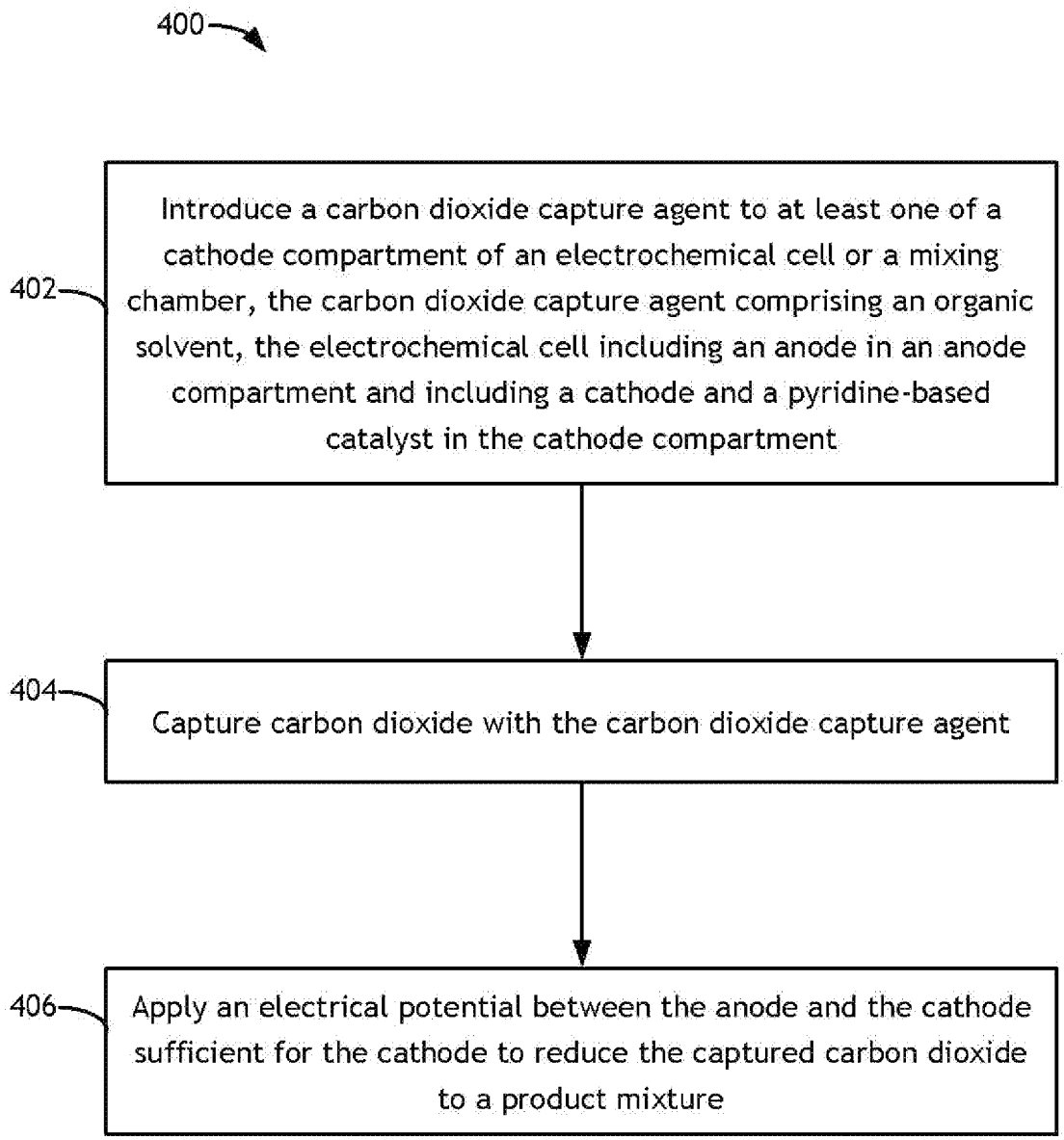
FIG. 4 is a flow diagram of a further preferred method of capture of carbon dioxide and electrochemical conversion of the carbon dioxide.

Referring to FIG. 4, a flow diagram of another preferred method 400 for capture of carbon dioxide and electrochemical conversion of the carbon dioxide is shown. The method (or process) 400 generally comprises a step (or block) 402, a step (or block) 404, and a step (or block) 406. The method 400 may be implemented using the system 100.

In the step 402, a carbon dioxide capture agent may be introduced to at least one of a cathode compartment of an electrochemical cell or a mixing chamber. The carbon dioxide capture agent may comprise an organic solvent. The electrochemical cell may include an anode in an anode compartment and may include a cathode and a pyridine-based catalyst in the cathode compartment. Capturing carbon dioxide with the carbon dioxide capture agent may be performed in the step 404. The second compartment may include a cathode and a pyridine-based catalyst. In the step 406, an electrical potential may be applied between the anode and the cathode sufficient for the cathode to reduce the captured carbon dioxide to a product mixture. The product mixture may include one or more of carbon monoxide, carbonate, and oxalate.

It is believed that the present disclosure and many of its attendant advantages will be understood by the foregoing description, and it will be apparent that various changes may be made in the form, construction and arrangement of the components thereof without departing from the scope and spirit of the disclosure or without sacrificing all of its material advantages. The form herein before described being merely an explanatory embodiment thereof, it is the intention of the following claims to encompass and include such changes.

What is claimed is:

1. A method for electrochemical conversion of carbon dioxide, comprising:
    (A) introducing a solvent to a first compartment of an electrochemical cell, the first compartment including an anode, the electrochemical cell including a second compartment containing a cathode;
    (B) capturing carbon dioxide with at least one of 1,1,3,3-tetramethylguanidine, 1,5,7-triazabicyclo[4.4.0]dec-5-ene, 7-methyl-1,5,7triazabicyclo[4.4.0]dec-5-ene, 1,8-diazabicyclo[5.4.0]undec-7-ene, 1,5-diazabicyclo[4.3.0]non-5-ene, and 1,4,5,6-tetrahydropyrimidine to form a carbamic zwitterion;
    (C) introducing the carbamic zwitterion to the second compartment via at least one of (i) forming the carbamic zwitterion in the second compartment or (ii) delivering the carbamic zwitterion to the second compartment; and
    (D) applying an electrical potential between the anode and the cathode sufficient for the cathode to reduce the carbamic zwitterion to a product mixture, the product mixture including an organic product derived in part from the carbon dioxide.

2. The method of claim 1, wherein capturing carbon dioxide with at least one of 1,1,3,3-tetramethylguanidine, 1,5,7-triazabicyclo[4.4.0]dec-5-ene, 7-methyl-1,5,7-triazabicyclo[4.4.0]dec-5-ene, 1,8- diazabicyclo[5.4.0]undec-7-ene, 1,5-diazabicyclo[4.3.0]non-5-ene, and 1,4,5,6-tetrahydropyrimidine to form a carbamic zwitterion includes: capturing carbon dioxide in the second compartment with the at least one of 1,3,3-tetramethylguanidine, 1,5,7-triazabicyclo[4.4.0]dec-5-ene, 7-methyl-1,5,7-triazabicyclo[4.4.0]dec-5-ene, 1,8-diazabicyclo[5.4.0]undec-7-ene, 1,5-diazabicyclo[4.3.0]non-5-ene, and 1,4,5,6-tetrahydropyrimidine to form the carbamic zwitterion, and wherein introducing the carbamic zwitterion to the second compartment via at least one of (i) forming the carbamic zwitterion in the second compartment or (ii) delivering the carbamic zwitterion to the second compartment includes: introducing the carbamic zwitterion to the second compartment via forming the carbamic zwitterion in the second compartment.

3. The method of claim 1, wherein capturing carbon dioxide with at least one of 1,1,3,3-tetramethylguanidine, 1,5,7-triazabicyclo[4.4.0]dec-5-ene, 7-methyl-1,5,7-triazabicyclo[4.4.0]dec-5-ene, 1,8-diazabicyclo[5.4.0]undec-7-ene, 1,5-diazabicyclo[4.3.0]non-5-ene, and 1,4,5,6-tetrahydropyrimidine to form a carbamic zwitterion includes: capturing the carbon dioxide in a mixing chamber with the at least one of 1,1,3,3-tetramethylguanidine, 1,5,7-triazabicyclo[4.4.0]dec-5-ene, 7-methyl-1,5,7-triazabicyclo[4.4.0]dec-5-ene, 1,8-diazabicyclo[5.4.0]undec-7-ene, 1,5-diazabicyclo[4.3.0]non-5-ene, and 1,4,5,6-tetrahydropyrimidine to form the carbamic zwitterion in the mixing chamber, and wherein introducing the carbamic zwitterion to the second compartment via at least one of (i) forming the carbamic zwitterion in the second compartment or (ii) delivering the carbamic zwitterion to the second compartment includes: introducing the carbamic zwitterion to the second compartment via delivering the carbamic zwitterion from the mixing chamber to the second compartment.

4. The method of claim 1, wherein applying an electrical potential between the anode and the cathode sufficient for the cathode to reduce the carbamic zwitterion to a product mixture includes:
    applying the electrical potential between the anode and the cathode sufficient for the cathode to reduce the carbamic zwitterion to the product mixture and to regenerate the at least one of 1,1,3,3-tetramethylguanidine, 1,5,7-triazabicyclo[4.4.0]dec-5-ene, 7-methyl-1,5,7-triazabicyclo[4.4.0]dec-5-ene, 1,8-diazabicyclo[5.4.0]undec-7-ene, 1,5-diazabicyclo[4.3.0]non-5-ene, and 1,4,5,6-tetrahydropyrimidine.

5. The method of claim 1, wherein the solvent is at least one of water, methanol, acetonitrile, dimethylfuran, or a mixture of water and an organic solvent.

6. The method of claim 1, wherein the organic product includes at least one of acetaldehyde, acetate, acetic acid, acetone, 1-butanol, 2-butanol, 2-butanone, carbon, carbon monoxide, a carbonate, ethane, ethanol, ethylene, formaldehyde, formate, formic acid, glycolate, glycolic acid, glyoxal, glyoxylic acid, graphite, isopropanol, lactate, lactic acid, methane, methanol, oxalate, oxalic acid, propanal, 1-propanol, and a polymer containing carbon dioxide.

7. A method for electrochemical conversion of carbon dioxide, comprising:
    (A) introducing a solvent to a first compartment of an electrochemical cell, the first compartment including an anode, the electrochemical cell including a second compartment containing a cathode;
    (B) capturing carbon dioxide with at least one of guanidine or a guanidine derivative to form a carbamic zwitterion;
    (C) introducing the carbamic zwitterion to the second compartment via at least one of (i) forming the carbamic zwitterion in the second compartment or (ii) delivering the carbamic zwitterion to the second compartment; and
    (D) applying an electrical potential between the anode and the cathode sufficient for the cathode to reduce the carbamic zwitterion to a product mixture, the product mixture including an organic product derived in part from the carbon dioxide.

8. A method for electrochemical conversion of carbon dioxide, comprising:
    (A) introducing a solvent to a first compartment of an electrochemical cell, the first compartment including an anode, the electrochemical cell including a second compartment containing a cathode;
    (B) capturing carbon dioxide with at least one of 1,8-diazabicyclo[5.4.0]undec-7-ene, 1,5-diazabicyclo

[4.3.0]non-5-ene, and 1,4,5,6-tetrahydropyrimidine to form a carbamic zwitterion;

(C) introducing the carbamic zwitterion to the second compartment via at least one of (i) forming the carbamic zwitterion in the second compartment or (ii) delivering the carbamic zwitterion to the second compartment; and (D) applying an electrical potential between the anode and the cathode sufficient for the cathode to reduce the carbamic zwitterion to a product mixture, the product mixture including an organic product derived in part from the carbon dioxide.

* * * * *